US012592239B2

(12) United States Patent
Khoury et al.

(10) Patent No.: US 12,592,239 B2
(45) Date of Patent: Mar. 31, 2026

(54) ACTIVE VOICE LIVENESS DETECTION SYSTEM

(71) Applicant: Pindrop Security, Inc., Atlanta, GA (US)

(72) Inventors: Elie Khoury, Atlanta, GA (US); Ganesh Sivaraman, Atlanta, GA (US); Tianxiang Chen, Atlanta, GA (US); Nikolay Gaubitch, Atlanta, GA (US); David Looney, Atlanta, GA (US); Amit Gupta, Atlanta, GA (US); Vijay Balasubramaniyan, Atlanta, GA (US); Nicholas Klein, Atlanta, GA (US); Anthony Stankus, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 161 days.

(21) Appl. No.: 18/646,310

(22) Filed: Apr. 25, 2024

(65) Prior Publication Data

US 2024/0363123 A1 Oct. 31, 2024

Related U.S. Application Data

(60) Provisional application No. 63/620,068, filed on Jan. 11, 2024, provisional application No. 63/462,913, filed on Apr. 28, 2023.

(51) Int. Cl.
*G10L 17/26* (2013.01)
*G06F 21/32* (2013.01)
(Continued)

(52) U.S. Cl.
CPC .............. *G10L 17/26* (2013.01); *G06F 21/32* (2013.01); *G10L 15/02* (2013.01); *G10L 17/00* (2013.01);
(Continued)

(58) Field of Classification Search
CPC ......... G10L 17/26; G10L 15/02; G10L 17/00; G10L 17/02; G10L 17/04; G10L 17/08;
(Continued)

(56) References Cited

U.S. PATENT DOCUMENTS 9,060,057 B1 * 6/2015 Danis .................... H04L 63/083
9,318,114 B2 4/2016 Zeljkovic et al.
(Continued)

FOREIGN PATENT DOCUMENTS

EP 3 156 978 A1 4/2017
FR 3105479 A1 6/2021
GB 2 612 032 A 4/2023
WO WO-2008/047339 A2 4/2008

OTHER PUBLICATIONS

International Preliminary Report on Patentability (including WO-ISA) from PCT/US2024/023576 dated Oct. 30, 2025.
(Continued)

*Primary Examiner* — Thuykhanh Le
(74) *Attorney, Agent, or Firm* — Foley & Lardner LLP

(57) ABSTRACT

Disclosed are systems and methods including software processes executed by a server that detect audio-based synthetic speech ("deepfakes") in a call conversation. Embodiments include systems and methods for detecting fraudulent presentation attacks using multiple functional engines that implement various fraud-detection techniques, to produce calibrated scores and/or fused scores. A computer may, for example, evaluate the audio quality of speech signals within audio signals, where speech signals contain the speech portions having speaker utterances.

20 Claims, 9 Drawing Sheets

(51) Int. Cl.

| | |
|---|---|
| *G10L 15/02* | (2006.01) |
| *G10L 17/00* | (2013.01) |
| *G10L 17/02* | (2013.01) |
| *G10L 17/04* | (2013.01) |
| *G10L 17/08* | (2013.01) |
| *G10L 17/18* | (2013.01) |
| *G10L 25/30* | (2013.01) |
| *G10L 25/51* | (2013.01) |
| *G10L 25/60* | (2013.01) |
| *H04M 3/22* | (2006.01) |
| *H04M 3/42* | (2006.01) |
| *H04M 3/51* | (2006.01) |

(52) U.S. Cl.
CPC .............. *G10L 17/02* (2013.01); *G10L 17/04* (2013.01); *G10L 17/08* (2013.01); *G10L 17/18* (2013.01); *G10L 25/51* (2013.01); *G10L 25/60* (2013.01); *H04M 3/2281* (2013.01); *H04M 3/42221* (2013.01); *H04M 3/5175* (2013.01); *H04M 3/5183* (2013.01); *G10L 25/30* (2013.01); *H04M 2201/405* (2013.01)

(58) Field of Classification Search
CPC ......... G10L 17/18; G10L 25/51; G10L 25/60; G10L 25/30; G06F 21/32; H04M 3/2281; H04M 3/42221; H04M 3/5175; H04M 3/5183; H04M 2201/405
USPC ........................................................ 704/270
See application file for complete search history.

(56) References Cited

U.S. PATENT DOCUMENTS

| | | | |
|---|---|---|---|
| 10,565,498 B1 | 2/2020 | Zhiyanov | |
| 10,607,148 B1* | 3/2020 | Niewczas | G10L 17/08 |
| 10,657,971 B1* | 5/2020 | Newstadt | G06N 20/00 |
| 10,720,165 B2 | 7/2020 | Guo et al. | |
| 10,853,579 B2 | 12/2020 | Laxman et al. | |
| 10,878,174 B1 | 12/2020 | Vontobel et al. | |
| 11,106,690 B1 | 8/2021 | Dhillon et al. | |
| 11,151,385 B2* | 10/2021 | Iyer | G06F 18/22 |
| 11,417,339 B1* | 8/2022 | Wang | G10L 15/197 |
| 11,481,434 B1 | 10/2022 | Venti et al. | |
| 11,532,301 B1 | 12/2022 | Hajebi et al. | |
| 11,943,387 B1 | 3/2024 | Wolinsky et al. | |
| 11,972,760 B1 | 4/2024 | Chavez et al. | |
| 12,026,241 B2 | 7/2024 | Lesso | |
| 12,062,105 B2* | 8/2024 | Liberman | G06N 3/0464 |
| 12,087,319 B1 | 9/2024 | Looney et al. | |
| 2003/0115191 A1 | 6/2003 | Copperman et al. | |
| 2005/0240779 A1 | 10/2005 | Aull et al. | |
| 2009/0319271 A1* | 12/2009 | Gross | G10L 15/22 |
| | | | 704/E15.001 |
| 2009/0319274 A1* | 12/2009 | Gross | G10L 17/22 |
| | | | 704/260 |
| 2012/0215776 A1 | 8/2012 | Guha et al. | |
| 2013/0218566 A1* | 8/2013 | Qian | G10L 13/033 |
| | | | 704/E11.001 |
| 2013/0262096 A1* | 10/2013 | Wilhelms-Tricarico | |
| | | | G10L 13/04 |
| | | | 704/207 |
| 2014/0270114 A1* | 9/2014 | Kolbegger | H04M 3/5166 |
| | | | 379/88.08 |
| 2015/0278341 A1 | 10/2015 | Shen | |
| 2016/0253548 A1* | 9/2016 | Dos Remedios | G06V 40/1371 |
| | | | 382/125 |
| 2016/0323398 A1 | 11/2016 | Guo et al. | |
| 2016/0328547 A1* | 11/2016 | Gross | H04L 63/123 |
| 2018/0077101 A1 | 3/2018 | Desouza Sana et al. | |
| 2018/0254046 A1* | 9/2018 | Khoury | G10L 25/24 |
| 2018/0261227 A1* | 9/2018 | Blouet | G10L 17/08 |
| 2019/0087870 A1* | 3/2019 | Gardyne | G11B 27/10 |

| | | | |
|---|---|---|---|
| 2019/0114496 A1* | 4/2019 | Lesso | G10L 25/66 |
| 2019/0114497 A1 | 4/2019 | Lesso | |
| 2019/0174000 A1* | 6/2019 | Bharrat | H04M 3/42059 |
| 2019/0206423 A1* | 7/2019 | Winton | G10L 21/0232 |
| 2019/0311722 A1* | 10/2019 | Caldwell | G10L 17/24 |
| 2019/0378520 A1* | 12/2019 | Chiu | G10L 17/26 |
| 2020/0044852 A1* | 2/2020 | Streit | G06N 3/082 |
| 2020/0118544 A1 | 4/2020 | Lee et al. | |
| 2020/0184979 A1 | 6/2020 | Keret et al. | |
| 2020/0194032 A1 | 6/2020 | Basye et al. | |
| 2020/0311738 A1* | 10/2020 | Gupta | G06F 16/22 |
| 2020/0314246 A1* | 10/2020 | Hart | H04M 3/5235 |
| 2021/0125619 A1 | 4/2021 | Espejo et al. | |
| 2021/0141896 A1* | 5/2021 | Streit | G06V 40/16 |
| 2021/0168238 A1* | 6/2021 | Adolphe | H04W 12/069 |
| 2021/0182584 A1 | 6/2021 | Ionita | |
| 2021/0193174 A1* | 6/2021 | Enzinger | G10L 17/00 |
| 2021/0233541 A1* | 7/2021 | Chen | G10L 17/02 |
| 2021/0280171 A1* | 9/2021 | Phatak | G06N 3/0442 |
| 2021/0312906 A1* | 10/2021 | Kuo | G06N 3/0442 |
| 2021/0335354 A1* | 10/2021 | Park | G10L 15/063 |
| 2021/0406568 A1 | 12/2021 | Liberman et al. | |
| 2022/0027648 A1* | 1/2022 | Trundle | G07C 9/00563 |
| 2022/0060578 A1* | 2/2022 | Kee | H04W 12/12 |
| 2022/0076077 A1* | 3/2022 | Reddy | G06N 3/084 |
| 2022/0084509 A1 | 3/2022 | Sivaraman et al. | |
| 2022/0108701 A1* | 4/2022 | Gupta | H04M 7/0078 |
| 2022/0124195 A1* | 4/2022 | Lu | H04W 4/16 |
| 2022/0215845 A1* | 7/2022 | Sharifi | G10L 17/08 |
| 2022/0269922 A1* | 8/2022 | Mathews | G06N 3/0464 |
| 2022/0328050 A1* | 10/2022 | Hennig | G10L 17/22 |
| 2022/0366901 A1 | 11/2022 | Rathaur et al. | |
| 2022/0366916 A1* | 11/2022 | dos Santos | G06N 3/04 |
| 2023/0008613 A1* | 1/2023 | Do | G10L 15/26 |
| 2023/0032728 A1* | 2/2023 | Hao | G06V 20/46 |
| 2023/0082094 A1* | 3/2023 | Keret | G06F 21/32 |
| | | | 726/2 |
| 2023/0107624 A1 | 4/2023 | Keith | |
| 2023/0134791 A1 | 5/2023 | Londeree | |
| 2023/0153815 A1* | 5/2023 | Blouet | G06N 20/00 |
| | | | 705/44 |
| 2023/0161853 A1* | 5/2023 | Nair | G10L 17/06 |
| | | | 726/18 |
| 2023/0179823 A1* | 6/2023 | Marten | H04N 21/234345 |
| | | | 725/32 |
| 2023/0196396 A1* | 6/2023 | Doumar | G06Q 50/01 |
| | | | 379/88.22 |
| 2023/0260521 A1 | 8/2023 | Slocum et al. | |
| 2023/0262160 A1* | 8/2023 | Trivedi | H04M 3/42102 |
| | | | 704/251 |
| 2023/0274758 A1* | 8/2023 | Markhasin | G10L 21/0308 |
| | | | 704/232 |
| 2023/0386506 A1* | 11/2023 | Shor | G06N 3/088 |
| 2024/0040035 A1 | 2/2024 | Dropuljic et al. | |
| 2024/0040066 A1* | 2/2024 | Liu | G10L 17/02 |
| 2024/0073219 A1* | 2/2024 | Maizels | H04L 63/108 |
| 2024/0127630 A1* | 4/2024 | Michaeli | G06V 40/172 |
| 2024/0127826 A1 | 4/2024 | Wolfston et al. | |
| 2024/0203408 A1* | 6/2024 | Li | G10L 15/24 |
| 2024/0249712 A1* | 7/2024 | Yao | G10L 13/047 |
| 2024/0296698 A1* | 9/2024 | Matias | G06V 20/40 |
| 2024/0346850 A1* | 10/2024 | Kolla | G06V 40/172 |
| 2024/0371510 A1* | 11/2024 | Aman | G16H 40/63 |
| 2024/0378274 A1 | 11/2024 | Tanski et al. | |
| 2024/0406227 A1* | 12/2024 | Pandit | H04M 7/0078 |
| 2024/0420725 A1* | 12/2024 | Caven, III | G10L 25/66 |
| 2025/0022473 A1 | 1/2025 | Eilam Tzoreff | |
| 2025/0078841 A1 | 3/2025 | Wu et al. | |
| 2025/0086213 A1 | 3/2025 | Dilipkumar et al. | |
| 2025/0273232 A1* | 8/2025 | Seo | G06V 20/46 |

OTHER PUBLICATIONS

International Preliminary Report on Patentability (including WO-ISA) from PCT/US2024/026212 dated Nov. 6, 2025.
International Search Report and Written Opinion on International Application No. PCT/US 24/26212 dated Oct. 18, 2024 (19 Pages).

(56) References Cited

OTHER PUBLICATIONS

Shiota et al., "Voice liveness detection algorithms based on pop noise caused by human breath for automatic speaker verification" published in Interspeech 2015 16th Annual Conference of the International Speech Communication Association. (Year:2015).

International Search Report and Written Opinion issued in International Application No. PCT/US24/23576 dated Sep. 6, 2024 (18 Pages).

Mittal et al. "AI-assisted Tagging of Deepfake Audio Calls using Challenge-Response." Published in ARXIV on Feb. 28, 2024, pp. 1-18, Retrieved on Aug. 14, 2024, Retrieved from: https://arxiv.org/abs/2402.18085.

* cited by examiner

ACTIVE VOICE LIVENESS DETECTION SYSTEM

CROSS-REFERENCE TO RELATED APPLICATIONS

The application claims the benefit of U.S. Provisional Application No. 63/462,913, filed Apr. 28, 2023, and U.S. Provisional Application No. 63/620,068, filed Jan. 11, 2024, each of which is incorporated by reference in its entirety.

TECHNICAL FIELD

This application generally relates to systems and methods for managing, training, and deploying a machine learning architecture for call audio processing and detecting instances of fraudulent machine-generated speech.

BACKGROUND

Voice is gaining importance as the preferred mode of interface with Internet of Things (IoT) devices, smartphones, and computers. Users are often identified and verified with speaker recognition technology to authenticate access to user accounts and for performing transactions. Automatic speaker verification (ASV) systems are often essential software programs for call centers. For instance, an ASV allows the callers or end-users (e.g., customers) to authenticate themselves to the call center based on the caller's voice during the phone call with a call center agent, or the ASV may capture spoken inputs to an interactive voice response (IVR) program of the call center. The ASV significantly reduces the time and effort of performing functions at the call center, such as authentication. Similar programs for detecting speech or automatically detect speakers, such as Voice Activity Detection (VAD), speaker diarization, and Automated Speaker Recognition (ASR), are also frequently employed.

A problem is that ASVs are vulnerable to malicious attacks, such as a "presentation attack." Generally, there are two types of presentation attacks. The first type is called "replay attack," when a malicious actor could replay the recorded audio to the ASV system to gain unauthorized access to a victim's account. The second is called a "deepfake attack," when a malicious actor employs software that outputs machine-generated speech (sometimes referred to as deepfake speech or machine-generated speech) using Text-To-Speech (TTS) or generative-AI software for performing speech synthesis or voice-cloning of any person's voice. The presentation attack generates voice signal outputs used to break (or "trick") a voice biometrics function of the authentication programming of the call center system, thereby gaining access to the features and benefits of the call center system or to a particular victim's account.

Moreover, the ubiquity of high-quality microphone enabled devices make it increasingly easier to record someone's voice without consent. A malicious actor could replay the recorded audio to a voice-enabled device to gain unauthorized access to a victim's account.

Another problem is that generative Al-based models make it increasingly easier to gather and generate high-quality speech synthesis for any person's voice. The synthetic speech could then be used to break the voice biometric to gain access to a victim's account. This is called a "deepfake attack." Deepfake technology has made significant advancements in recent years, enabling the creation of highly realistic, but fake, still imagery, audio playback, and video playback, employable for any number of purposes, from entertainment to misinformation, to launching deepfake attacks.

What is needed is improved means for detecting fraudulent uses of audio-based deepfake technology over telecommunications channels. What is further needed are improved voice biometric systems to check whether the voice received is from a live person who is speaking into a microphone. This is called "voice liveness detection."

SUMMARY

Disclosed herein are systems and methods capable of addressing the above-described shortcomings and may also provide any number of additional or alternative benefits and advantages. Embodiments include systems and methods for detecting any state of audio-based deepfake technology in a call conversation scenario, such as detecting deepfake audio speech signals in calls made to enterprise or customer-facing call centers.

Embodiments include systems and methods for detecting fraudulent presentation attacks using multiple functional engines that implement various fraud-detection techniques, to produce calibrated scores and/or fused scores. A computer may, for example, evaluate the audio quality of speech signals within audio signals, where speech signals contain the speech portions having speaker utterances. The accuracy of passive liveness detection varies across different environmental conditions, such as background noise and reverberation, so the confidence of a liveness detection system depends on speech quality. It is therefore beneficial to evaluate the audio speech quality (using objective measures of speech quality parameters) to derive or understand the level of confidence in outputted liveness decisions or other determinations output by the system. Speech quality estimation software ("speech quality estimator" or "audio quality estimator") may, for example, evaluate and score the speech-audio quality by estimating various acoustic parameters. Some examples of acoustic parameters include the Signal-to-Noise Ratio (SNR), reverberation time, and Direct-to-reverberant ratio (DRR), among others. In some embodiments, the system may detect instances of fraud when the acoustic parameters are insufficient or indicative of fraud. In some embodiments, the computer may reference the acoustic parameters to calibrate other types of scoring outputs of the system. In some embodiments, the system may reference the acoustic parameters to determine that the end-user should provide an improved a speech sample. The quality estimator may algorithmically combine the acoustic parameters to generate an overall quality score ($S_Q$).

Liveness detection can be improved further with two-way interactions. Embodiments may include one or more computers that implement spoken content verification software ("content verifier") that prompts a user to speak a specific phrase prompted on a screen's user interface. This form of active liveness detection involves active user engagement. A computer generates prompts randomly or according to pre-configure passphrases that are transmitted to the end-user device, which the caller must speak. The computer receives the spoken response signal and converts the speech sample into one or more representations. The content verifier includes components (e.g., machine-learning models, layers, neural network architecture) of a machine-learning architecture trained to detect the spoken responses and generate a spoken content representation based on the various techniques that scoring functions or scoring layers of the content verifier are programmed or trained to execute for determining similarities or dissimilarities between the spoken response and the text of the verification prompt. The content verifier outputs a spoken content verification score ($S_C$) indicating a probability that the content of the spoken response is the same as the text of the verification prompt. Some embodiments of the content verifier may reference the acoustic environment parameters or the quality score, as generated by the audio quality estimator, to calibrate the content verification score or outputs generated by the content verifier. In this way, embodiments can employ the audio quality score to confirm active liveness-related outputs with higher accuracy and mitigate false outputs.

Embodiments may include one or more computers that implement passive liveness detection software ("passive liveness detector") for detecting presentation attacks, such as replayed audio recording of a person's voice or synthetic speech produced by deepfake software or TTS software. A computer takes an audio input signal as input, extracts a set of features from the audio signal indicative of fraud artifacts in the speech portions and, in some cases, in the non-speech portions. A fakeprint embedding extractor extracts a fakeprint feature vector embedding (may be referred to as a "fakeprint" or "spoofprint") using the set of features. Scoring layers of a machine-learning architecture are trained to score the fakeprint based on similarities to previously trained and generated clusters or similarities to previously extracted and stored enrolled fakeprints. The scoring layers or other component of the passive liveness detector outputs a passive liveness score ($S_P$). Some embodiments of the passive liveness detector may reference the acoustic environment parameters or the quality score, as generated by the audio quality estimator, to calibrate the passive liveness score or outputs generated by the passive liveness detector. In this way, embodiments can employ the audio quality score to confirm the passive liveness-related outputs with higher accuracy and mitigate false outputs.

Embodiments may include one or more computers that implement speaker verification software ("speaker verifier") for identifying and confirming the identity of the caller A computer takes an audio input signal as input, extracts a set of features from the audio signal indicative of particular speakers in the speech portions of the audio signal. A voiceprint embedding extractor extracts a voiceprint feature vector embedding (sometimes referred to as a "voiceprint" using the set of features. Scoring layers of a machine-learning architecture are trained to score the voiceprint based on similarities to previously extracted and stored enrolled voiceprints. The scoring layers or other component of the speaker verifier outputs a speaker verification score ($S_V$) indicating a probability that the caller is an enrolled user associated with a particular enrolled voiceprint. Some embodiments of the speaker verifier may reference the acoustic environment parameters or the quality score, as generated by the audio quality estimator, to calibrate the speaker verification score or outputs generated by the speaker verifier. In this way, embodiments can employ the audio quality score to confirm the voice-related outputs with higher accuracy and mitigate false outputs.

Embodiments may include one or more computers that implement software that detects repeated instances of voice recording replays using audio-fingerprints (sometimes referred to as an "audio fingerprint engine"). A computer takes an audio input signal as input, extracts a set of features from the audio signal indicative of the particular audio recording from the speech portions of the audio signal and, in some cases, the non-speech portions. An audioprint embedding extractor extracts an audioprint feature vector embedding (may be referred to as an "audioprint") using the set of features. The set of audioprint features may be comparatively smaller than the features extracted for the voiceprint. The querying employed for the audioprints may implement a graph structure for comparatively faster results in detecting matches compared to voiceprint matching. The computer generates or updates a graph representing the features of previously observed audio recordings. Moreover, the computer may quickly extract the features and audioprint from a new audio recording and compare the features of the audioprint against the graph and/or other audioprints to quickly detect whether the system previously encountered the new audio recording. Scoring layers of a machine-learning architecture are trained to score the audioprint based on matches to the graph and/or similarities to previously extracted and stored audioprints. The scoring layers or other component of the audio fingerprint engine outputs an audio match score ($S_{AFP}$) indicating a probability that the current call contains a replayed recording of an earlier call. Some embodiments of the audio fingerprint engine may reference the acoustic environment parameters or the quality score, as generated by the audio quality estimator, to calibrate the audio match score or outputs generated by the audio fingerprint engine. In this way, embodiments can employ the audio quality score to confirm the replay detection with higher accuracy and mitigate false outputs.

Embodiments may include software for generating combined or fused liveness detection scores based upon a plurality of scores. The combined liveness detector includes layers and functions of the machine-learning architecture trained to generate the fused liveness score ($S_L$) for a call based on, for example, the speaker verification score ($S_V$), content verification score ($S_C$), the speech quality estimation score ($S_Q$), audio match score ($S_{AFP}$), and/or the passive liveness detection score ($S_P$).

In an embodiment, a computer-implemented method for detecting machine-based speech in calls may comprise obtaining, by a computer, a verification prompt comprising challenge content for display at a user interface of a user device of a speaker; obtaining, by the computer, an input audio signal comprising a speech signal containing response content as an utterance of the speaker, wherein the response content in the speech signal purportedly matches to the challenge content of the verification prompt; extracting, by the computer, a text embedding using a first set of features extracted for the text of the challenge content of the verification prompt, and a spoken content embedding using a second set of features extracted using the speech signal of the input audio signal; and executing, by the computer, a content verification engine to generate a content verification score indicating a probability that the response content matches to the challenge content, the content verification engine having one or more layers of machine-learning architecture trained to determine a distance between the text embedding and a spoken content embedding and output the content verification score according to the distance.

In another embodiment, a system for detecting machine-based speech in calls may comprise a computer comprising at least one processor, configured to: a computer comprising at least one processor, configured to: obtain a verification prompt comprising challenge content for display at a user interface of a user device of a speaker; obtain an input audio signal comprising a speech signal containing response content as an utterance of the speaker, wherein the response content in the speech signal purportedly matches to the challenge content of the verification prompt; extract a text embedding using a first set of features extracted for the text of the challenge content of the verification prompt, and a spoken content embedding using a second set of features extracted using the speech signal of the input audio signal; and execute the content verification engine taking the training text embedding and the training response content embedding to generate a predicted content verification score according to a predicted distance between a training text embedding and a training spoken content embedding.

In another embodiment, a computer-implemented method for detecting machine-based speech in calls may comprise obtaining, by a computer, an inbound audio signal comprising a speech signal containing response content as an utterance of the speaker, wherein the response content in the speech signal purportedly matches to challenge content of a verification prompt; extracting, by the computer, a text embedding using a first set of features extracted for text of the challenge content, a spoken content embedding using a second set of features extracted for the speech signal, and a fakeprint using a third set one or more features extracted for one or more fraud artifacts of the speech signal; generating, by the computer, a content verification score based upon a distance between the text embedding and the spoken content embedding; executing, by the computer, a passive liveness detector to generate a passive liveness score for the inbound audio signal, the passive liveness detector having a set of layers of a machine-learning architecture trained to classify and score the input audio signal based upon the fakeprint extracted for the fraud artifacts of the inbound audio signal; generating, by the computer, a fused liveness score based upon the content verification score and the passive liveness score; and identifying, by the computer, the inbound audio signal as genuine or fraudulent based upon comparing the fused liveness score against an overall risk threshold.

In another embodiment, a system for detecting machine-based speech in calls may comprise a computer having at least one processor, configured to: obtain an inbound audio signal comprising a speech signal containing response content as an utterance of the speaker, wherein the response content in the speech signal purportedly matches to challenge content of a verification prompt; extract a text embedding using a first set of features extracted for text of the challenge content, a spoken content embedding using a second set of features extracted for the speech signal, and a fakeprint using a third set one or more features extracted for one or more fraud artifacts of the speech signal; generate a content verification score based upon a distance between the text embedding and the spoken content embedding; execute a passive liveness detector having a set of layers of a machine-learning architecture to generate a passive liveness score for the inbound audio signal, the passive liveness detector trained to classify and score the input audio signal based upon the fakeprint extracted for the fraud artifacts of the inbound audio signal; generate a fused liveness score based upon the content verification score and the passive liveness score; and identify the inbound audio signal as genuine or fraudulent based upon comparing the fused liveness score against an overall risk threshold.

In another embodiment, a computer-implemented method for detecting fraud in calls by repeated recordings may comprise receiving, by a computer, an inbound audio signal from a user device associated with a caller containing a speech signal for one or more utterances of the caller; extracting, by the computer, an inbound audioprint for the inbound audio signal using the one or more features extracted from the speech signal of the inbound audio signal; generating, by the computer, an audio replay score for the inbound audio signal indicating an audio recording recognition likelihood that the inbound audio signal matches a prior audio signal based upon a distance between the inbound audioprint and a prior audioprint for the prior audio signal; and identifying, by the computer, the inbound audio signal as a replayed recording or unrecognized recording based upon comparing the audio replay score against a replay detection threshold.

In another embodiment, a system for detecting fraud in calls by repeated recordings may comprise a computer comprising at least one processor, configured to: receive an inbound audio signal from a user device associated with a caller containing a speech signal for one or more utterances of the caller; extract an inbound audioprint for the inbound audio signal using the one or more features extracted from the speech signal of the inbound audio signal; generate an audio replay score for the inbound audio signal indicating an audio recording recognition likelihood that the inbound audio signal matches a prior audio signal based upon a distance between the inbound audioprint and a prior audioprint for the prior audio signal; and identify the inbound audio signal as a replayed recording or unrecognized recording based upon comparing the audio replay score against a replay detection threshold.

In another embodiment, a computer-implemented method for detecting fraudulent speech in media data may comprise receiving, by a computer, media data including a speech signal in an audio signal of the media data; determining, by the computer, a plurality of segments of the media data according to a preconfigured segmenting boundary; for each segment of the media data, extracting, by the computer, a segment fakeprint for the segment using a plurality of segment features extracted using a speech portion of the speech signal occurring in the segment; generating, by the computer, a segment liveness score for the segment based upon a distance between the segment fakeprint and a classification threshold value; and identifying, by the computer, the portion of the speech signal in the segment as genuine or fraudulent based upon comparing the segment liveness score for the segment against a fraud detection threshold.

In another embodiment, a system for detecting fraudulent speech in media data may comprise a computer comprising at least one processor configured to: receive media data including a speech signal in an audio signal of the media data; determine a plurality of segments of the media data according to a preconfigured segmenting boundary; for each segment of the media data, extract a segment fakeprint for the segment using a plurality of segment features extracted using a speech portion of the speech signal occurring in the segment; generate a segment liveness score for the segment based upon a distance between the segment fakeprint and a classification threshold value; and identify the portion of the speech signal in the segment as genuine or fraudulent based upon comparing the segment liveness score for the segment against a fraud detection threshold.

In another embodiment, a computer-implemented method for generating liveness scores for detecting fraud occurring in calls may comprise obtaining, by a computer, an input audio signal including one or more speech signals representing one or more utterances of a speaker; extracting, by the computer, a fakeprint for the input audio signal using one or more fraud artifact features extracted from the input audio signal; determining, by the computer, a magnitude value for the fakeprint based upon a vector length of the fakeprint; executing, by the computer, a passive liveness detector having one or more layers of a machine-learning architecture to generate a liveness score for the input audio signal, the passive liveness detector trained to determine the liveness score taking the fakeprint as an input and calibrate the liveness score using the magnitude value.

In another embodiment, a system for generating liveness scores for detecting fraud occurring in calls may comprise a computer comprising at least one processor configured to: receive media data including a speech signal in an audio signal of the media data; determine a plurality of segments of the media data according to a preconfigured segmenting boundary; for each segment of the media data, extract a segment fakeprint for the segment using a plurality of segment features extracted using a speech portion of the speech signal occurring in the segment; generate a segment liveness score for the segment based upon a distance between the segment fakeprint and a classification threshold value; and identify the portion of the speech signal in the segment as genuine or fraudulent based upon comparing the segment liveness score for the segment against a fraud detection threshold.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
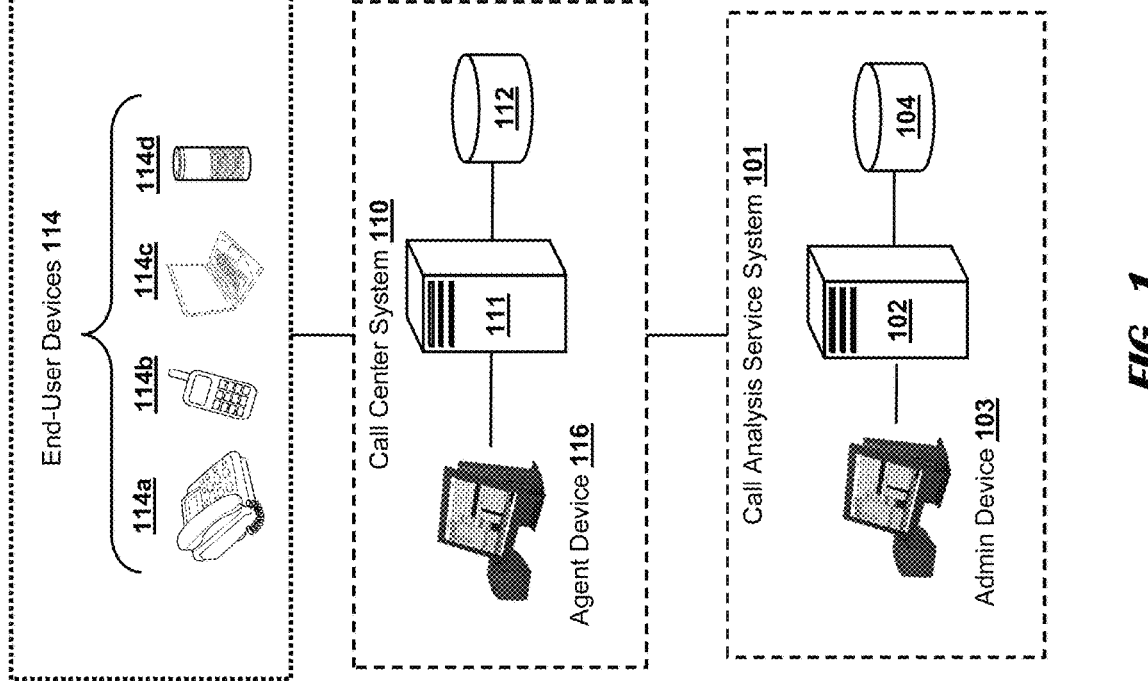
FIG. 1 shows components of an example system for handling and analyzing calls from callers, according to an embodiment.
Figure 1:

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments may include one or more computers that implement speaker verification software ("speaker verifier") for identifying and confirming the identity of the caller A computer takes an audio input signal as input, extracts a set of features from the audio signal indicative of particular speakers in the speech portions of the audio signal. A voiceprint embedding extractor extracts a voiceprint feature vector embedding (sometimes referred to as a "voiceprint" using the set of features. Scoring layers of a machine-learning architecture are trained to score the voiceprint based on similarities to previously extracted and stored enrolled voiceprints. The scoring layers or other component of the speaker verifier outputs a speaker verification score ($S_V$) indicating a probability that the caller is an enrolled user associated with a particular enrolled voiceprint.

Embodiments may include speaker recognition and content verification for active liveness detection. Liveness detection can be improved further with two-way interactions. A computer may implement spoken content verification software ("content verifier") that prompts a user to speak a specific phrase prompted on a screen's user interface. This form of active liveness detection involves active user engagement. The computer generates prompts randomly or according to preconfigure passphrases that are transmitted to the end-user device, which the caller must speak. The computer receives the spoken response signal and converts the speech sample into one or more representations. The content verifier includes components (e.g., machine-learning models, layers, neural network architecture) of a machine-learning architecture trained to detect the spoken responses and generate a spoken content representation based on the various techniques that scoring functions or scoring layers of the content verifier are programmed or trained to execute for determining similarities or dissimilarities between the spoken response and the text of the verification prompt. The content verifier outputs a spoken content verification score ($S_C$) indicating a probability that the content of the spoken response is the same as the text of the verification prompt.

Embodiments may include active liveness detection based upon combined or fused scores from the scoring layers or classifiers of various functional engines described herein. A computer may execute software for generating combined or fused liveness detection scores based upon a plurality of scores. The combined liveness detector includes layers and functions of the machine-learning architecture trained to generate the fused liveness score ($S_L$) for a call based on, for example, the speaker verification score ($S_V$), content verification score ($S_C$), the speech quality estimation score ($S_Q$), audio match score ($S_{AFP}$), and/or the passive liveness detection score ($S_P$).

Embodiments may perform liveness detection for various types of applications using audio signal inputs obtained via multiple types of interfaces, such as application programmable interfaces (APIs). In some embodiments, the combined liveness detector having a plurality of trained classifiers for liveness detection and speaker verification ingests audio inputs from the APIs of communications programs, such as MS Teams® or Zoom®. The combined liveness detector can be used for authentication or risk-scoring for those communications program based on multiple types of scores (e.g., Speaker Verification score, Content Verification score, Speech Quality Estimation score, Passive Liveness Detection score). Additionally or alternatively, the combined liveness detector may implement an audio quality estimator to detect flawed audio inputs and help a user correct the audio setup at the user device, such as suggestions for placing the user's microphone further or closer.

Embodiments may perform liveness detection using audio fingerprinting for detecting repeated instances of replayed audio recordings for identifying presentation attacks. A computer may implement software that detects the repeated instances of voice recording replays using audio-fingerprints (sometimes referred to as an "audio fingerprint engine"). The computer takes an audio input signal as input, extracts a set of features from the audio signal indicative of the particular audio recording from the speech portions of the audio signal and, in some cases, the non-speech portions. An audioprint embedding extractor extracts an audioprint feature vector embedding (sometimes referred to as an "audioprint") using the set of features. The set of audioprint features may be comparatively smaller than the features extracted for the voiceprint. The querying employed for the audioprints may implement a graph structure for comparatively faster results in detecting matches compared to voiceprint matching. The computer generates or updates a graph representing the features of previously observed audio recordings. Moreover, the computer may quickly extract the features and audioprint from a new audio recording and compare the features of the audioprint against the graph and/or other audioprints to quickly detect whether the system previously encountered the new audio recording. Scoring layers of a machine-learning architecture are trained to score the audioprint based on matches to the graph and/or similarities to previously extracted and stored audioprints. The scoring layers or other component of the audio fingerprint engine outputs an audio match score ($S_{AFP}$) indicating a probability that the current call contains a replayed recording of an earlier call.

Embodiments may implement liveness detection using segment scoring of media data for partial deepfake detection, occurring in segmented parts of the media data. In some embodiments, the computer receives and parses media data (e.g., data stream, media files) into segments and generates one or more liveness detection scores (or other types of scores) for each successive segment. The computer then outputs a liveness detection score for the speech portions in each partial segment of the media data. In some cases, for example, the combined liveness detector includes layers and functions of the machine-learning architecture trained to ingest successive segments of the media file, generate the various types of scores for the particular segment, and output the fused liveness detection score or individual scores for the segment. The computer may continuously extract and score features for segments of the media data input. The liveness detector may compute a new score for the next segment at a predetermined interval (e.g., every 3 seconds) of spoken audio within the media input or in response to a triggering event (e.g., when a particular speaker begins speaking, when a threshold amount of speech portions has been collected for a speaker). In this way, the liveness detector may analyze the audio data, segment-by-segment, to detect whether only a partial segment of the media has been manipulated or otherwise fraudulent.

Embodiments may determine audio quality parameters and an audio quality score to calibrate components and outputs of a liveness detection system, including calibrating using magnitude values of embeddings and/or using an amount of net speech available for a speaker in an audio signal. In some embodiments, a computer analyzes and evaluates the audio quality of speech signals within audio signals containing the speech portions by executing an audio quality estimator. The audio quality estimator may, for example, generate one or more audio quality scores the speech quality by estimating various acoustic parameters in the audio data. The quality estimator may algorithmically combine the acoustic parameters to generate an overall quality score ($S_Q$). In some implementations, the system may detect instances of fraud when the acoustic parameters are insufficient or indicative of fraud according to one or more corresponding quality score thresholds. In some implementations, the computer may reference the acoustic parameters or quality score to calibrate other types of scoring outputs of the system, such as liveness scores or verification scores. In some embodiments, the computer may reference the acoustic parameters to determine that the end-user should provide an improved a speech sample, such as detecting instances of low-quality speech signals for a user during a Zoom® call and generating a message or alert notification suggesting the user move close the microphone.

In some embodiments, the audio quality estimator or other software component of the system may generate a magnitude value for an embedding feature vector (e.g., fakeprint, voiceprint) representing the severity of the features of the extracted embedding. The magnitude value is based on the dimensional length of the feature vector and various factors relative to the type of features and/or type of embedding, such as the level of noise in a fakeprint or amount of speech in voiceprint, among other types of acoustic features and content of the speech itself. The computer may reference the magnitude value among other acoustic parameters or the quality score to calibrate other types of scoring outputs.

In some embodiments, the audio quality estimator or other software component of the system may determine a net speech value indicating an amount of speech portions of speaker in an audio signal. The computer may receive or parse a speech signal of an audio signal containing speech portions representing utterances of the speaker. The computer may then determine the net speech value for the speaker, representing the total amount speech of the speaker in the audio signal as analyzed by the computer. The computer may reference the net speech value among other acoustic parameters or the quality score to calibrate other types of scoring outputs.

FIG. 1 shows components of an example system 100 for handling and analyzing calls from callers, according to an embodiment. The system 100 includes components that, for example, recognize and authenticate callers, and evaluate fraud risks for calls. Evaluating or detecting fraud risks may include operations for identifying instances of fraudulent audio signals, such as deepfake or synthetic audio signals, received during a conversation over a telephone call or any app-based call having audio features (e.g., WhatsApp® call, Skype® call). The system 100 comprises a call analytics system 101, call center systems 110 of customer enterprises (e.g., companies, government entities, universities), and caller devices 114a-114d (generally referred to as end-user devices 114 or an end-user device 114). The call analytics system 101 includes analytics servers 102, analytics databases 104, and admin devices 103. The call center system 110 includes call center servers 111, call center databases 112, and agent devices 116.

Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The description of FIG. 1 mentions circumstances in which a calling end-user (caller) places a current or inbound call through various communications channels to contact and interact with the services offered by the call center system 110, though the operations and features of the speaker verification and fraud-risk detection techniques described herein may be applicable to any circumstances involving a voice-based interface between the caller and the services offered by the call center system 110. The call may be placed using various types of telephony communications, implementing the hardware, software, and protocols corresponding to the type of communications channel. For instance, the operations described herein could be implemented by any call center system 110 that receives speaker audio inputs via one or more types of communications channels. The end-users can, for example, access user accounts, services, or features of the service provider and service provider's call center system 110, which may include interacting with human agents or with software applications (e.g., cloud application, website-based application with voice interface) hosted by call center servers 111. In some implementations, the users of the service provider's call center system 110 may access the user accounts or other features of the service provider by placing calls using the various types of end-user devices 114. The callers may also access the user accounts or other features of the service provider using software executed by certain end-user devices 114 configured to exchange data and instructions with software programming (e.g., the cloud application) hosted by the call center servers 111. The customer call center system 110 may include, for example, human agents who converse with callers during telephone calls, Interactive Voice Response (IVR) software executed by the call center server 111, or the cloud software programming executed by the call center server 111. The customer call center 110 need not include any human agents, such that the end-user interacts only with the IVR system or the cloud software application.

The end-user devices 114 may be any communications or computing device that the caller operates to access the services of the call center system 100 through the various types of communications channels. The end-user devices 114 comprise or connect with a microphone device for capturing audio waveforms and converting the audio waveforms to electrical audio signals. The caller may place the call to the call center system 110 through a telephony network or through a software application executed by the caller device 114. A device of the call center system 110, such as a provider server 111, captures and forwards the input audio signal data to the analytics system 101 to perform the various processes described herein. Non-limiting examples of caller devices 114 may include landline phones 114a, mobile phones 114b, calling computing devices 114c, edge devices 104d, or other types of electronic devices capable of voice communications. The landline phones 114a and mobile phones 114b are telecommunications-oriented devices (e.g., telephones) that communicate via telecommunications channels. The end-user device 114 is not limited to the telecommunications-oriented devices or channels. For instance, in some cases, the mobile phones 114b may communicate via a computing network channel (e.g., the Internet). The caller device 114 may also include an electronic device comprising a processor and/or software, such as a caller computing device 114c or edge device implementing, for example, voice-over-IP (VOIP) telecommunications, data-streaming via a TCP/IP network, or other computing network channel. The edge device 114d may include any Internet of Things (IoT) device or other electronic device for network communications. The edge device 114d could be any smart device capable of executing software applications and/or performing voice interface operations. Non-limiting examples of the edge device 114d may include voice assistant devices, automobiles, smart appliances, and the like.

In some embodiments, the analytics server 102 or provider server 111 executes software for a webserver that hosts website or web application, accessible to the end-user device 114 via the one or more networks. The end-user devices 114 execute a native application or web browser that navigates to, or otherwise accesses, the various services or operations of the webserver by communicating with the analytics server 102 or the provider server 111. The end-user device 114 may request or receive various types of files, data, or messages from the webserver to interact with the services of the analytics system 101 or call center system 110, according to various software programs and protocols for communicating over the networks and providing information for display in a user interface, presented at a screen of the end-user device 114. For instance, the analytics server 102 may execute processes for generating and transmitting a verification prompt for display at the user interface of the end-user device 114. In some cases, the user may interact with the provider server 111 and the analytics server 102 using one or more end-user devices 114. As an example, the caller could place a call to the call center system 110 using a landline phone 114a and receive the verification prompt at a browser or application of a computer 114c. As another example, the caller could place a call to the call center system 110 using a smart phone 114b and receive the verification prompt at an application or browser of the smart phone 114b; or, similarly, place the call using a computer 114c and receive the verification prompt at an application or browser of the computer 114c.

The call center system 110 comprises various hardware and software components that capture and store various types of data or metadata related to the caller's contact with the call center system 110. This data may include, for example, audio recordings of the call or the caller's voice and metadata related to the protocols and software employed for the particular communication channel. The audio signal captured with the caller's voice has a quality based on the particular communication used. For example, the audio signals from the landline phone 114a will have a lower sampling rate and/or lower bandwidth compared to the sampling rate and/or bandwidth of the audio signals from the edge device 114d.

The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The analytics server 102 of the call analytics system 101 may be any computing device comprising hardware (e.g., at least one processor, non-transitory machine-readable media) and software (e.g., executable machine-readable instructions stored in non-transitory media), and capable of performing the various processes and tasks described herein. The analytics server 102 may host or be in communication with the analytics database 104, and receives and processes call data (e.g., audio recordings, metadata) received from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes audio-processing software that includes one or more machine-learning architectures having functions, layers, and other aspects of a machine-learning architecture (e.g., machine-learning models) to perform various types of operations for speaker recognition, verification and authentication, and fraud detection (e.g., deepfake or liveness detection; spoof detection). For ease of description, the analytics server 102 is described as executing a single machine-learning architecture, though multiple neural network architectures could be employed in some embodiments. The machine-learning architecture includes various sub-components implemented through software programming executed by the analytics server 102, such as input layers, layers for embedding extraction, and scoring layers, among others.

Embodiments of the machine-learning architecture may include a frontend component and a backend component, each of which includes an arrangement of various software routines and aspects (e.g., machine-learning layers, functions, machine-learning models) of the machine-learning architecture. The components of the frontend generally ingest and process the input data. As an example, in some embodiments, the frontend may include software routines for ingesting input data (e.g., input audio signals; input media data; data augmentation; normalized inputs) and generating and extracting or certain types of data (e.g., simulated data signals for training; feature vectors or embeddings; transformed representations of the input signals). For instance, the frontend may include input layers, speech recognizers, and embedding extractors, among others. The components of the backend generally perform the analysis, make determinations, and produce outputs, such as scores, classifications, or instructions for downstream software programs. As another example, in some embodiments, the backend may include software routines for classifying or scoring the input data signals, such as scoring layers and classifiers, among others. It should be appreciated that arrangements and functions of the frontend and backend components described herein are not intended to be limiting on potential embodiments.

The machine-learning architecture operates logically in several operational phases, including a training phase, an enrollment phase, and a deployment phase (sometimes referred to as a "test" phase, "testing," or "inference time"), though some embodiments or components of the machine-learning architecture need not perform the enrollment phase. The inputted audio signals processed by the analytics server 102 and the machine-learning architecture include training audio signals processed during the training phase, enrollment audio signals processed during the enrollment phase, and inbound audio signals processed during the deployment phase. The analytics server 102 applies the machine-learning architecture to each type of inputted audio signal during the corresponding operational phase.

The analytics server 102 or other computing device of the system 100 (e.g., call center server 111) can perform various pre-processing operations and/or data augmentation operations on the input audio signals. Non-limiting examples of the pre-processing operations on inputted audio signals may include: performing bandwidth expansion, down-sampling or up-sampling, extracting low-level features, parsing and segmenting the audio signal into frames or segments, and performing one or more transformation functions (e.g., FFT, SFT), among other potential pre-processing operations. Non-limiting examples of data augmentation operations include audio clipping, noise augmentation, frequency augmentation, and duration augmentation, among other potential data augmentation operations. The analytics server 102 may perform the pre-processing or data augmentation operations prior to feeding the input audio signals into input layers of the neural network architecture. Additionally or alternatively, the analytics server 102 may execute pre-processing or data augmentation operations when executing operations of input layers of the machine-learning architecture, where the input layers (or other layers) of the machine-learning architecture perform certain pre-processing or data augmentation operations.

During the training phase, the analytics server 102 receives training audio signals of various lengths and characteristics (e.g., bandwidth, sample rate, types of degradation) from one or more corpora, which may be stored in an analytics database 104 or other storage medium. The training audio signals include clean audio signals (sometimes referred to as samples) and simulated audio signals, each of which the analytics server 102 uses to train the various layers of the machine-learning architecture. The clean audio signals are audio samples containing speech in which the speech and the features are identifiable by the analytics server 102. Certain data augmentation operations executed by the analytics server 102 retrieve or generate the simulated audio signals for data augmentation purposes during training or enrollment. The data augmentation operations may generate additional versions or segments of a given training signal containing manipulated features mimicking a particular type of signal degradation or distortion. The analytics server 102 stores the training audio signals into the non-transitory medium of the analytics server 102 and/or the analytics database 104 for future reference or operations of the machine-learning architecture.

The analytics server 102 executes various types of operational engines, as described herein (e.g., embedding extractors, speaker verifier, spoken content verifier, passive liveness detector), each of which may form or implement layers of the machine-learning architecture or layers of a separate machine-learning architecture. The machine-learning models of the various operational components or engines include generally include functions or layers that are programmed or trained to perform determinations, scoring functions, classifications, or otherwise generate outputs. During the training phase and, in some implementations, the enrollment phase, the output layers of the particular operational engine perform the particular operations, such as scoring layers or classifier layers, receives a training input and generates a predicted output.

As an example, an embedding extractor (e.g., voiceprint extractor, fakeprint extractor) receives training audio signals, transforms the audio signal into a spectro-temporal representation of the training audio signal, and feed the transformed representation into the neural network architecture to extract the features and feature vector embedding. Fully-connected layers of the neural network architecture generate the training feature vector for each of the many training audio signals and a machine-learning model of a classifier may determine or predict whether the predicted feature vector was extracted from, for example, a genuine or fraudulent audio signal. In some cases, a loss function (e.g., LMCL) determines levels of error for the plurality of training feature vectors, based on determining a distance between the predicted feature vector and an expected feature vector indicated by training labels or other ground truth expected embedding. The loss function may adjust weighted values (e.g., hyper-parameters) of the machine-learning architecture of the embedding extractor until the outputted training feature vectors converge with the predetermined expected feature vectors. When the training phase concludes, the analytics server 102 stores the weighted values and trained machine-learning model(s) into the non-transitory storage media (e.g., memory, disk) of the analytics server 102. In some cases, during the enrollment and/or the deployment phases, the analytics server 102 disables one or more layers (e.g., fully-connected layers, classifier, loss function) of a given operational engine (e.g., embedding extractors, speaker verifier, spoken content verifier, passive liveness detector). In this way, the analytics server 102 keeps certain weighted values fixed after training or bypasses certain functions that are only relevant to and useful for training purposes. Additional examples of functions and features of the operational phases are described herein with respect to the various types of operational engines and sub-components of the machine-learning architecture.

The analytics server 102 may execute software programming for a speech recognizer program capable of detecting utterances of the caller or other speaker-user. Non-limiting examples of the speech recognizer include an automatic speech recognition (ASR) program, a Voice Activity Detection (VAD) program, a speaker diarization program, and a speaker verifier program (e.g., speaker verifier 202), or other types of software programs capable of detecting or identifying instances of speaker utterances occurring in audio recordings. The speech recognizer detects instances of spoken utterances of speech that occur in certain portions of the audio signal data (or other form of multimedia data). The speech recognizer may then output various types of data representations of the speech portions detected in the audio signal. In some embodiments, for example, the speech recognizer detects the speech portions of the input audio signal, parses or filters the speech portions away from the non-speech portions of the input audio signal, and outputs a speech signal as an audio signal that contains an aggregation of the speech portions detected in and parsed from the input audio signal.

In some embodiments, the speech recognizer or other component of the system (e.g., embedding extractors, feature extractors, quality estimators) instructs the analytics server 102 (or other device of the system 100 performing the parsing operations) to parse an input audio signal (e.g., training signal, enrollment signal, inbound signal) into successive segments. For each successive segment, the analytics server 102 executes one or more of the operational engines described herein taking the particular segment as input. Each operational engine then outputs the particular score or determination for the particular segment. The analytics server 102 may generate an alert notification or message when the analytics server 102 determines that one or more segments includes a presentation attack or does not match an enrolled user or other expected score. In these embodiments, the analytics server 102 feeds the speech signal (of the audio signal data or media data) of the successive segment into the various operational engines described herein, which produce or output the scores or other determination outputs (e.g., message indicators) that indicate the probability of fraud or speaker verification for that segment.

It should be appreciated that embodiments implementing segmented analysis need not be limited to audio inputs. In some embodiments, the analytics server 102 (or any other computing device) receives media data, such as video data, in the form of a file or feed. Similar to the discussion above with respect to parsing input audio signals, the analytics server 102 may continuously and iteratively parse the media data into segments and analyze the audio data containing the speech portions of each successive segment to determine one or more types of scores or outputs for each of the segments of the media file.

The analytics server 102 or other device of the system 100 executes software routines for extracting features and/or feature vector embeddings from input data, which are sometimes referred to as "feature extractors" or "embedding extractors." The analytics server 102 may, for example, take raw audio as input, and feed the raw audio or a set of features (e.g., acoustic features) from the audio signal into programming and machine-learning models of the embedding extractors. The feature vector embeddings and features include mathematical representations or values of various types of information or characteristics for audio signals or other types of data. The embedding extractors take the audio signals as input and extract the embeddings. The mathematical representations of the embeddings extracted by the embedding extractors may include, for example, i-vectors (embedding) derived from a GMM-based embedding extractor, x-vectors derived from a DNN-based embedding extractor, and c-vectors from a CNN-based embedding extractor, among other types of feature vector embeddings or types of machine-learning models of embedding extractors.

The machine-learning models of the embeddings extractors are programmed and trained to extract certain features and feature vectors for particular downstream operations and determinations. The embedding extractors generate the feature vectors representing certain types of embeddings, according to an operational phase of the machine-learning architecture. The embedding extractors extract, for example, training embeddings from training data during a training phase, enrolled embeddings from enrollment data during and enrollment phase, and inbound embeddings from inbound data during the deployment phase. Non-limiting examples of the feature vectors or embeddings may include voiceprint embeddings ("voiceprints"), fakeprint embeddings ("fakeprints"), and audio recording fingerprint embeddings ("audioprints"), among others.

The embedding extractor software programming implements, for example, a neural network architecture of the machine-learning architecture, where the neural network architecture of the embedding extractor contains one or more layers or functions that extract the features and embeddings from input audio signals. The layers for the embedding extractor may include, for example, a convolutional neural network (CNN), a deep neural network (DNN), or a ResNet neural network architecture, among others.

As an example, the neural network architecture of a voiceprint embedding extractor extracts a set of features from audio signals for voiceprints. The feature vectors generated when extracting the voiceprint are based on a set of features reflecting the speaker's voice. As another example, the neural network architecture of a voiceprint embedding extractor extracts a set of features from audio signals for fakeprints, which are different (at least in part) from the set of features extracted for the voiceprints. The feature vectors generated when extracting the fakeprint are based on a set of features including audio characteristics that are artifacts of fraud are useful in detecting presentation attacks, such as certain aspects of how the speaker or fraudster speaks, including, for example, speech patterns of genuine humans that are difficult for text-to-speech (TTS), speech synthesizers, and deepfake production tools to emulate. The fraud artifacts are also detectable or difficult to avoid when fraudsters employ replays of prior spoken audio signals. The embodiments described herein include different embedding extractors of a machine-learning architecture for generating the various types of embeddings, though embodiments may include a common or integrated embedding extractor of the machine-learning architecture for generating the various types of embeddings.

The analytics server 102 may execute software programming for authenticating or verifying a speaker-user (referred to as software routines of a "speaker verifier" for ease of description an understanding). The speaker verification software programming includes functions and layers of the machine-learning architecture trained to verify or authenticate the identity of a caller-speaker. The output of the speaker verifier includes, for example, a voice match score ($S_v$), and/or a verification message or indicator that indicates whether the voice match score satisfies one or more speaker verification threshold values.

Given one or more enrollment embeddings for a particular speaker, a machine-learning model of a voiceprint embedding extractor computes and extracts one or more enrollment feature vectors. The voiceprint extractor algorithmically combines the enrollment feature vectors to compute and extract the enrolled voiceprint as a mathematical representation of the enrolled speaker's voice. The voiceprint extractor executes a computation for combining the feature vectors, such as averaging the enrollment feature vector embeddings, but the computation could also be more complex where other information, such as the quality of the audio, gender, age and other metadata is used to compute the feature vector embeddings. If a user is enrolled, then a machine-learning model of the speaker verifier is trained to generate and estimate the voice match score, based on the distance or a mathematical similarity between the enrolled speaker embedding and the inbound speaker embedding extracted from the inbound audio signal presented at the voice interface at deployment. The voice match score indicates the mathematical similarity between the enrolled speaker embedding and the inbound embedding. The speaker verifier computes the similarity value for the voice match score by, for example, computing a cosine similarity or distance measurement between the enrolled speaker embedding and the inbound embedding, or executing a probabilistic linear discriminant analysis (PLDA).

During enrollment, the analytics server 102 or provider server 111 will record a few seconds of free speech or prompted texts from the end-user device 114 of an enrollee. The analytics server 102 or provider server 111 may capture the enrollment data signals. The analytics server 102 may perform the enrollment functions (e.g., capturing enrollment data, extracting enrollment embeddings) actively during in an interactive enrollment process or service. Additionally or alternatively, the analytics server 102 may perform the enrollment functions passively in the background, without prompting or otherwise engaging with the end-user in formal enrollment process or service. The speaker verifier receives the enrollment feature vectors of the embedding extractor to create a speaker's enrolled voiceprint and adds it to the analytics server 102 of enrolled speakers (enrollees or enrolled users). At verification time, during deployment, when the analytics server 102 receives a new utterance in an inbound audio signal, the voiceprint extractor may extract an inbound embedding (inbound feature vector) for the inbound caller. The speaker verifier generates the voice match score by computing a distance or similarity score between the inbound embedding and the enrolled voiceprint. If the verification score satisfies a predefined threshold, then the speaker verifier determines that the caller-speaker is the enrolled user.

The analytics server 102 may execute software programming for analyzing and verifying spoken content of a speaker-user (referred to as software routines of a "spoken content verifier" for ease of description an understanding). A speech recognizer (e.g., ASR, VAD, speaker diarization) and/or an embedding extractor may include machine-learning models trained to extract textual or contextual information about spoken content from a speech signal. For instance, the speech recognizer can extract the textual content corresponding to the speech audio at different levels of detail, such as phonetic pronunciation level, text summarizations, and intent recognition, among others.

The content verifier includes or communicates with a prompt generator program. The prompt generator program instructs the analytics server 102 or provider server 111 to generate and transmit a verification prompt for display at the end-user device 114. The verification prompt includes challenge content configured to be displayed at the end-user device 114, where the verification prompt may be any type or format of data or machine-executable code that are compatible with the software programming and user interface of the end-user device 114. For example, the provider server 111 or analytics server 102 includes a webserver program hosting a website accessed by a browser of the end-user device 114. The analytics server 102, executing the prompt generator, may generate the verification prompt using data and code for presentation at the website, compatible with the website of the analytics server 102 or provider server 111 and browser of the end-user device 114. The caller reviews the challenge content of the verification prompt presented on the end-user device 114 and speaks a response aloud. The end-user device 114 sends a speech signal containing the spoken response content to the analytics server 102 or provider server 111.

The prompt generator generates and transmits the verification prompt to the end-user device 114 of the caller. The verification prompt includes the challenge content (e.g., text, image) and prompts the caller to speak an expected response corresponding or matching to the challenge content of the verification prompt. The challenge content may include randomly generated or selected text or a randomly generated or selected image for display on the screen and user interface of the end-user device 114. Additionally or alternatively, the challenge content may include a predefined passphrase, which the analytics server 102 retrieves from the analytics database 104 or provider database 112.

At the frontend of the machine-learning architecture, the speech recognizer or other software component of the content verifier generates a spoken response content representation of the spoken utterance in the inputted audio signal. Likewise, the prompt generator or other software component of the content verifier generates a challenge content representation of the challenge content in the verification prompt.

At the backend of the machine-learning architecture, a content verification engine of the content verifier includes one or more machine-learning models trained classify and/or score the spoken response content in the input speech signal. The content verification engine ingests the challenge content representation and the response content representation and generates a content verification score ($S_c$). The content verifier may determine the content verification by computing or executing various techniques. Non-limiting examples of the operations for determining the content verification score may include: computing an error rate, computing a Levenshtein distance, computing a path likelihood ratio, computing a text similarity, and determining a distance between a text embedding extracted from the text of the challenge content and a content embedding extracted from the speech signal. The content verifier generates the content verification score by computing a distance or similarity score between the inbound embedding and the enrolled voiceprint. If the content verification score satisfies a predefined threshold, then the content verifier determines that the caller's spoken response content matches to the challenge content (i.e., an expected spoken response).

The analytics server 102 may execute software programming for passive liveness detection to detect instances of fraud, such as instances of deepfakes and spoofing (referred to as software routines of a "passive liveness detector" for ease of description an understanding). The passive liveness detector includes functions and layers of the machine-learning architecture programmed and trained to detect a presentation attack, such as replayed pre-recorded human speech or synthetic speech (e.g., deepfake, TTS-generated speech).

The liveness detector takes input audio signals as input and generates and outputs a liveness score ($S_P$), indicating a probability or likelihood that the audio signal includes a fraudulent speech signal for a presentation attack. At the frontend, a fakeprint embedding extractor may take a speech signal of an input audio signal or just the speech signal containing a speech portions, and extract features and a fakeprint embedding. These operations and data structures are similar to the voiceprint embedding and the voiceprint embedding extractor used by the speaker verifier, but the fakeprint embedding and the fakeprint features represent fraud-related artifacts of speech signals that are typically present in the replayed speech or synthetic speech of presentation attacks.

The fakeprint embedding extractor may extract a set of features from an input audio signal containing or indicative of fraud artifacts, and then extract the fakeprint using the set of fakeprint features. The fakeprints are extracted using fakeprint features that are (at least in part) different from the set of voice-related features extracted for voiceprints. The low-level features extracted from an audio signal may include mel frequency cepstral coefficients (MFCCs), HFCCs, CQCCs, and other features related to the speaker voice characteristics. Additionally or alternatively, the fakeprint features include fraud-related artifacts of, for example, the speaker (e.g., speaker speech characteristics, speaker patterns) and/or the end-user device 114 or network (e.g., DTMF tones, background noise, codecs, packet loss). As an example, the voiceprint feature vector embeddings are based on a set of features reflecting the speaker's voice characteristics, such as the spectro-temporal features (e.g., MFCCs, HFCCs, CQCCs). As another example, the fakeprint feature vectors embeddings are based on a set of features indicative of fraud, including audio characteristics of the call, such as fraudulent-speaker artifacts (e.g., specific aspects of how the speaker speaks), which may include the frequency that a speaker uses certain phonemes (patterns) and the speaker's natural rhythm of speech, among others. The fraud artifacts used for the fakeprint embedding are often difficult for synthetic speech programs to emulate.

At the backend, the passive liveness detector includes a fraud classifier having scoring layers for generating liveness scores representing a likelihood of fraud and classifying the inbound audio signal a fraudulent or genuine. The passive liveness detector includes one or more machine-learning models trained to analyze and detect audio signals containing instances of a presentation attack, such as replayed pre-recorded human speech or instances of synthetic speech (e.g., deepfakes, TTS-generated speech). The passive liveness detector includes scoring layers for generating the liveness score ($S_P$) indicating a likelihood or probability that the inbound audio signal includes a presentation attack, and a classifier for determining whether the inbound audio signal is fraudulent or genuine. If the liveness score satisfies a predefined detection threshold value, then the passive liveness detector determines that the input audio signal is a source of fraud that contains a presentation attack. Otherwise, the passive liveness detector determines that the input speech signal originated from a real human-speaker and the input audio signal is genuine or non-fraudulent.

In some cases, the analytics server 102 may execute the passive liveness detector in the enrollment phase, where the fakeprint extractor obtains enrollment speech signals (e.g., receives from end-user device 114, retrieves from provider server 111) and extracts fakeprint embeddings for register users and/or for types of fraud known to contain the types of fraud. For instance, the fakeprint extractor could generate the enrolled fakeprint as an enrolled feature vector for detecting presentation attacks that spoof and misappropriate the enrolled user's voice. The passive liveness detector may generate the liveness score based on a similarity or distance between an inbound fakeprint and an enrolled fakeprint. If the liveness score satisfies a predefined detection threshold value, then the passive liveness detector determines that the input audio signal is a source of fraud that contains a presentation attack. Otherwise, the passive liveness detector determines that the input speech signal originated from a real human-speaker (i.e., the actual enrolled user during the inbound call) and the input audio signal is genuine.

The analytics server 102 may execute software programming for speech quality estimation for identifying and evaluating acoustic parameters affecting a speech signal in an audio signal (referred to as software routines of a "speech quality estimator" for ease of description an understanding). The quality of a speech signal may have a significant impact on the results of the various types of audio-processing operations, such as the liveness detection and speaker verification operations. The quality of the speech signal is impacted by types of degradation that occurs in the audio signal comprising the speech signal. Generally, there are two sources of degradation that might cause audio degradation or speech degradation. The first source of degradation is caused by an acoustic environment in which the speech signal is being captured by a microphone of the end-user device 114. The second source of degradation is caused by processes for capturing and/or transmitting the audio signal containing the speech signal. The acoustic environment generally includes two types of noise, additive background noise (e.g., unwanted audio sources) and reverberation (e.g., acoustic reverberation occurring in the environment). The audio capture and transmission sources of degradation include various types of acoustic or channel artifacts that degrade the speech signal quality, due to, for example, the microphone characteristics capturing the audio signal having the speech signal, compression for storage or transmission of the audio signal data, and transmission artifacts (e.g., packet loss).

The speech quality estimator includes functions and layers of the machine-learning architecture for estimating various acoustic parameters corresponding to or representing types of degradation impacting the audio signal. Examples of such acoustic parameters include Signal-to-Noise Ratio (SNR), a measure of reverberation time (e.g., time needed for sound decay), and a parameter characterizing the early to late reverberation ratio (e.g., Direct-to-Reverberant Ratio (DRR), sound clarity at a given time interval, sound definition at a given time interval). The reverberation time for the acoustic environment can be characterized as the time for sound to decay by, for example, 60 dB or 30 dB (denoted as T60 or T30, respectively). The reverberation time can also be characterized as Early Decay Time (EDT), which is the time needed for the sound to decay by, for example, 10 dB. The early to late reverberation ratio can be characterized as the sound clarity at, for example, 50 ms or 80 ms (denoted as C50 or C80, respectively). The early to late reverberation ratio can also be characterized as the sound definition at, for example, 50 ms or 80 ms (denoted as D50 or D80, respectively). The acoustic parameters may also include a net speech value indicating a total amount of speech captured for a speaker-user in the audio signal. The acoustic parameters may further include a magnitude value based upon a dimensional length and values of one or more embeddings (e.g., voiceprint, fakeprint) extracted for the particular audio signal.

In some implementations, the speech quality estimator extracts a set of parameters related to the acoustic environment from the observed speech signal or by controlled measurement that are algorithmically combined. The speech quality estimator outputs the speech quality score ($S_Q$) that represents or quantifies the speech quality and degradation of the speech signal of the audio signal. Additionally or alternatively, in some implementations, the speech quality estimator includes an end-to-end machine-learning architecture (e.g., neural network architecture) having a machine-learning model that implements an objective function for the speech quality score. In some cases, the speech quality estimator performs joint estimation acoustic parameters, which beneficially reduces estimation bias.

In some implementations, the analytics server 102 uses the speech quality score to evaluate the confidence level of functions or outputs of the various components of the audio-processing operations, such as liveness detection or speaker verification. If the analytics server 102 determines the speech quality fails a quality threshold (and the speech quality is deemed poor), the analytics server 102 or other operates may be halt further operations and not proceed with further evaluations. In some implementations, the analytics server 102 transmits a correction prompt or request to the end-user device 114, requesting the caller to take a corrective action (e.g., move to a quieter place or to move closer to the microphone), enter a new speech sample to the microphone of the end-user device 114, and transmit a new speech signal. In some implementations, the various operational components for audio processing (e.g., liveness detector, speaker verifier) may ingest the speech quality parameters or the speech quality score and then use the speech quality parameters or the speech quality score to calibrate the embeddings (e.g., voiceprint, fakeprint) or the scores (e.g., voice match score, passive liveness score).

The analytics server 102 may execute software programming of an audio fingerprint (sometimes referred to as an "audioprint") engine for active or passive liveness detection by extracting and evaluating the audioprints. The analytics server 102 the audio fingerprint engine quickly detects repeated instances of previously received or observed recordings of audio signals.

At the frontend, the audio fingerprint engine includes an audioprint embedding extractor that extracts audioprint embeddings and a set of features tailored to quickly detecting instances of repeated speech utterances. The audio fingerprint engine is programmed and trained to detect identical speech samples by extracting and storing a small audioprint of each audio signal file that the analytics server 102 or call center system 110 encounters. The analytics server 102 stores the audioprints into the analytics database 104. Storage, querying, and retrieval of audioprints is comparatively smaller and quicker than storage, querying, and retrieval voiceprints, with a comparatively lower search time.

For each new audio signal, the audio fingerprint engine of the analytics server 102 extracts an inbound audioprint and compares the inbound audioprint against prior audioprints stored in the analytics server 102. If the audio fingerprint engine determines that the inbound audioprint does not match any prior audioprints, then audio fingerprint engine determines that the new audioprint is a new audio signal and stores the new inbound audioprint into the analytics server 102, which the audio fingerprint engine may reference later as a prior audioprint. If the audio fingerprint engine determines that the inbound audioprint matches a prior audioprint, the audio fingerprint engine detects a repeated instance of an audio recording. The analytics server 102 may halt further functions, end or reject the call, or perform other mitigation operations. The output of the audio fingerprint engine includes, for example, generating an audio match score ($S_{AFP}$) or a message or binary indicator that indicates whether the inbound audio signal was previously encountered by the analytics system 101 or call center system 110.

The analytics server 102 may execute software programming for combined liveness detection (referred to as software routines of a "combined liveness detector" for ease of description an understanding). The combined liveness detector is programmed and trained to detect instances of fraud, such as instances of deepfakes and spoofing, using passive and active liveness detection, speaker verification, and/or by combining multiple outputs of operational engines used for evaluating the audio signals. The combined liveness detector ingests various outputs (e.g., voice match score ($S_V$), content match score ($S_C$), liveness detection score ($S_P$)) of the corresponding upstream software components (e.g., speaker verifier, content verifier, passive liveness detector) and generates a fused liveness score ($S_L$).

The analytics database 104 and/or the call center database 112 may contain any number of corpora of training audio signals that are accessible to the analytics server 102 via one or more networks. In some embodiments, the analytics server 102 employs supervised training to train the machine-learning models of the machine-learning architecture, where the analytics database 104 includes labels associated with the training audio signals that indicate, for example, the characteristics or features of the training audio signals. The analytics server 102 may also query an external database (not shown) to access a third-party corpus of training audio signals. An administrator may configure the analytics server 102 to select the training audio signals having certain characteristics or features.

The call center server 111 of a call center system 110 executes software processes for managing a call queue and/or routing calls made to the call center system 110 through the various channels, where the processes may include, for example, routing calls to the appropriate call center agent devices 116 based on the inbound caller's comments, instructions, IVR inputs, or other inputs submitted during the inbound call. The call center server 111 can capture, query, or generate various types of information about the call, the caller, and/or the caller device 114 and forward the information to the agent device 116, where a graphical user interface (GUI) of the agent device 116 displays the information to the call center agent. The call center server 111 also transmits the information about the inbound call to the call analytics system 101 to preform various analytics processes on the inbound audio signal and any other audio data. The call center server 111 may transmit the information and the audio data based upon preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111. The agent device 116 includes a user interface that presents the information determined by the analytics server 102 about the caller or end-user device, including one or more scores or determinations, such as a message or alert notification indicating the call is likely fraud. The admin device allows the call center to agent to manage the agent's ongoing call status or queue, which includes allowing the agent to reject calls or route calls or otherwise perform mitigation actions when the analytics server 102 determines and indicates that the call is likely fraud.

Figure 2A:
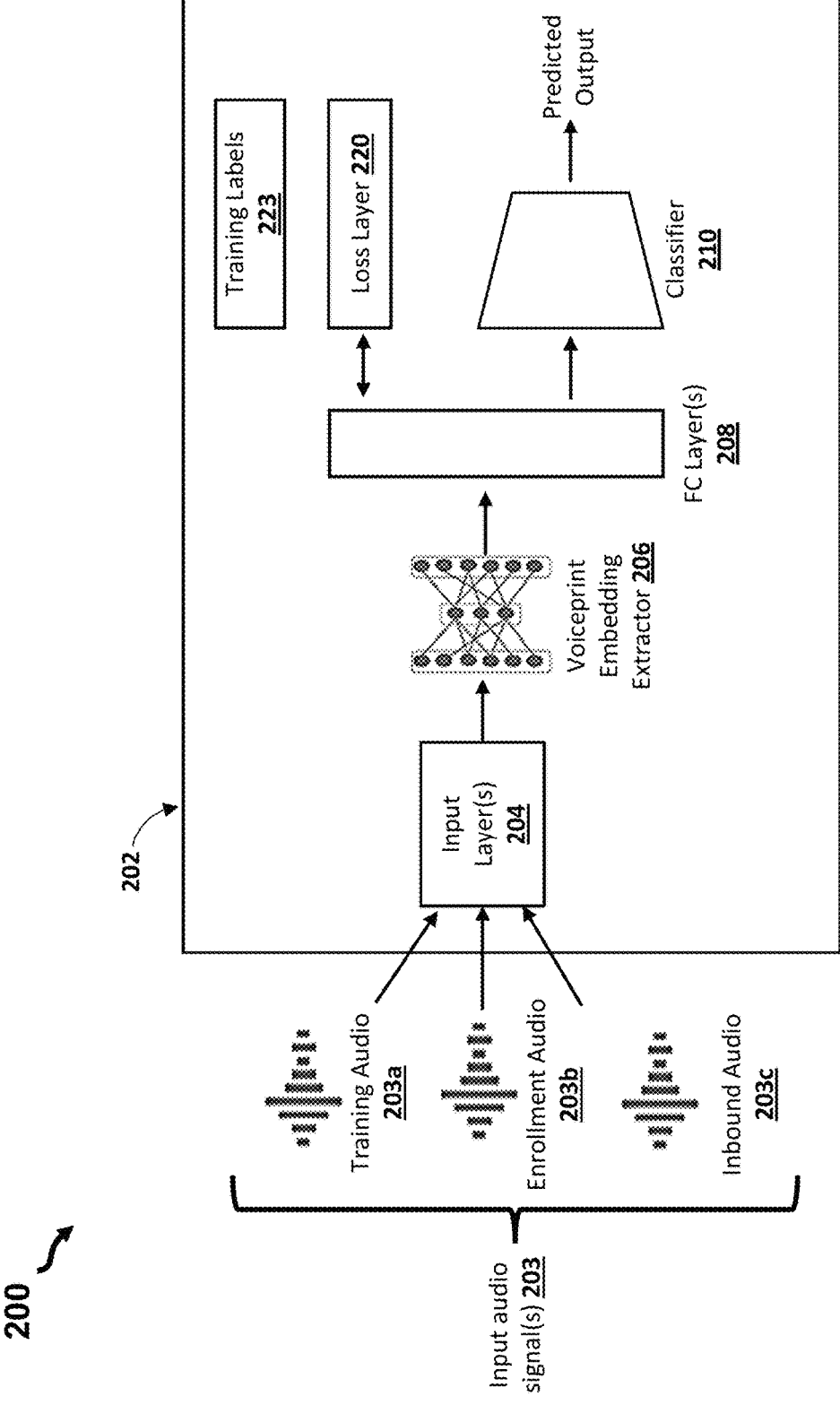
FIGS. 2A-2B show dataflow amongst components of a system for speaker verification and authentication, according to an embodiment.
Figure 2B:
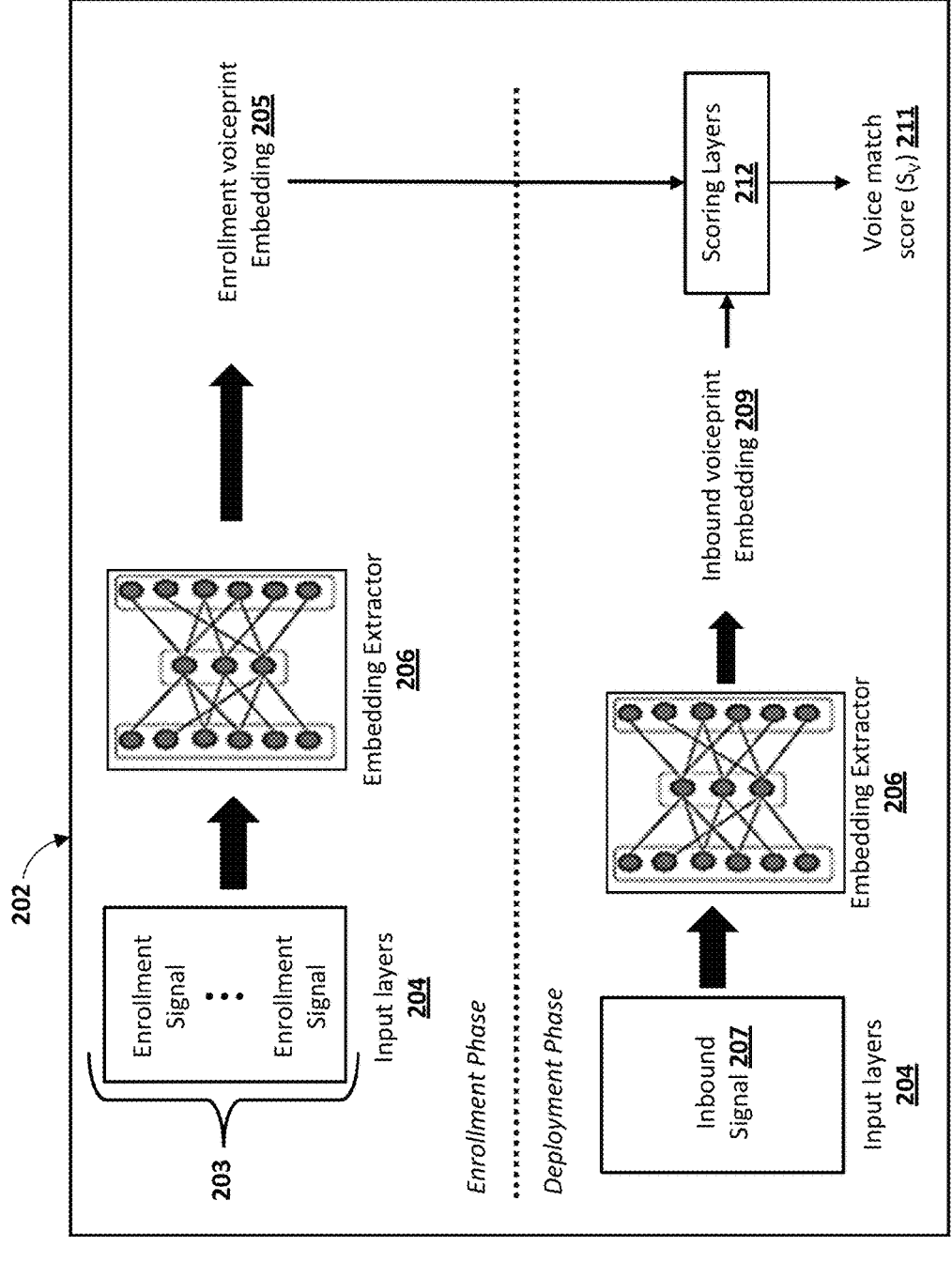

FIGS. 2A-2B show dataflow amongst components of a system 200 for speaker verification and authentication. The system 200 includes a server (e.g., analytics server 102) executing software programming and routines that implement a machine-learning architecture for speaker verification and authentication (referred to as a speaker verifier 202 for case of description and understanding). In the example embodiment of FIGS. 2A-2B, the server executes the speaker verifier 202 during enrollment and deployment (sometimes referred to as "test" phase or "inference time") operational phases, though the software components of the machine-learning architecture may be executed by any computing device comprising hardware (e.g., processor, non-transitory storage medium) and software components capable of performing operations of the speaker verifier 202, and/or by any number of such computing devices.

The speaker verifier 202 includes or is embodied in software programming that execute various functions, layers, or other aspects (e.g., machine-learning models) of the machine-learning architecture of the speaker verifier 202. In the example system 200, the speaker verifier 202 includes input layers 204 for ingesting audio signals 203, 207 and performing various pre-processing and augmentation operations; layers that define an embedding extractor 206 for extracting features, feature vectors, and speaker embeddings 205, 209; and one or more scoring layers 208 that perform various scoring operations, such as a distance scoring operation, to produce a voice match score 211 ($S_V$) or similar types of scores (e.g., authentication score, risk score) or other determinations.

With reference to FIG. 2A, in the training phase, the server feeds the training audio signals 203a into the input layers 204, where the training audio signals 203a may include any number of genuine and fraudulent audio signals, as indicated by training labels 223 associated with the training audio signals 203a. The training audio signals 203a may be raw audio files or pre-processed according to one or more pre-processing operations. The input layers 204 may perform one or more pre-processing operations on the training audio signals 203a. The input layers 204 extract certain features from the training audio signals 203a and perform various pre-processing and/or data augmentation operations on the training audio signals 203a. For instance, input layers 204 execute a transform function to convert the training audio signals 203a from a time-frequency domain to a spectro-temporal representation or convert the training audio signals 203a into multi-dimensional log filter banks (LFBs). The training audio signals 203a are then fed into functional layers defining the embedding extractor 206. The embedding extractor 206 generates predicted feature vectors based on the predicted features fed into the embedding extractor 206, which extracts, for example, a predicted voiceprint embedding based upon the one or more predicted feature vectors.

The machine-learning model(s) of the voiceprint embedding extractor 206 is trained by executing a loss function of a loss layer 220 for tuning the voiceprint extractor 206 according to the training labels 223 associated with the training audio signals 203a. The classifier 210 uses the voiceprint embeddings to determine whether the given input audio signal 203 is, for example, a recognized speaker, genuine, or fraudulent, among others. The loss layer 220 tunes the voiceprint extractor 206 by performing the loss function (e.g., LMCL, PLDA) to determine the distance (e.g., large margin cosine loss) between the predicted classifications, as indicated by supervised training label 223 or previously generated learning clusters. In some embodiments, a user may tune the loss layer 220 (e.g., adjust the m value of the LMCL function) to tune the sensitivity of the loss function. The server feeds the training audio signals 203a into the speaker verifier 202 to re-train and further tune the layers of the speaker verifier 202 and/or tune the voiceprint extractor 206. The server fixes the hyper-parameters of the voiceprint extractor 206 and/or the fully-connected layers 208 when the server determines that the predicted outputs (e.g., classifications, feature vectors, embeddings) converge with the expected outputs, such that a level of error is within a threshold margin of error.

With reference to FIG. 2B, during the optional enrollment phase, the server feeds one or more enrollment audio signals 203b into the embedding extractor 206 to extract an enrollment voiceprint embedding 205 for an enrollee. The embedding extractor 206 produces enrollee embeddings 205 for each of the enrollment audio signals 203b. The voiceprint extractor 206 or other component of the speaker verifier 202 then performs the combination operation on the enrollment feature vectors to extract the enrolled voiceprint 205 for the enrolled user. The enrollment voiceprint embedding 205 is then stored into memory of a database. The server may complete the enrollment phase after generating the enrollment voiceprint embedding 205 based on a threshold number of enrollment audio signals 203b or after updating the enrollment voiceprint embedding 205 using a most recent inbound audio signal 203c received for the enrolled user following a real-world interaction during deployment.

In some embodiments, the server may disable the classifier 210, scoring layers 208, loss layers 220, or other layers of the speaker verifier 202 for the enrollment phase or deployment phase. In some embodiments, the speaker verifier 202 may use the enrollment voiceprint embeddings 205 to further tune the aspects of the speaker verifier 202. The speaker verifier 202 may feed the enrollment voiceprint embeddings 205 into classifier 210 or scoring layers 212, which may include portions of the fully-connected layers 208, to generate a predicated output based on the enrollment audio signal 203b. The loss layers 220 may determine the level error between the predicted outputs of the classifier 210 or scoring layers 212 and the expected outputs based on the inbound audio signal 203c and enrollment voiceprint embedding 205.

During the deployment phase, the input layers 204 may perform the pre-processing operations to prepare an inbound audio signal 203c for the embedding extractor 206. The server, however, may disable the augmentation operations of the input layers 204, such that the embedding extractor 206 evaluates the features of the inbound audio signal 203c as received. The embedding extractor 206 comprises one or more layers of the machine-learning architecture trained (during a training phase) to detect speech and/or generate feature vectors based on the features extracted from the audio signals 203c, which the embedding extractor 206 outputs as inbound voiceprint embeddings 209. The embedding extractor 206 generates the inbound feature vector for the inbound audio signal 203c based on the features extracted from the inbound audio signal 203c. The embedding extractor 206 outputs this feature vector as an inbound voiceprint 209 for the inbound audio signal 203c.

The speaker verifier 202 feeds the enrolled voiceprint 205 and the inbound voiceprint 209 to the scoring layers 212 to perform various scoring operations. The scoring layers 212 perform a distance scoring operation that determines the distance (e.g., similarities, differences) between the enrolled voiceprint 205 and the inbound voiceprint 209, indicating the likelihood that the inbound voiceprint 209 is fraudulent. For instance, a lower distance score for the inbound voiceprint 209 indicates the inbound voiceprint 209 is more likely to be a presentation attack. The speaker verifier 202 may output a voice match score 211 ($S_r$), which may be a value generated by the scoring layers 212 based on one or more scoring operations (e.g., distance scoring). The scoring layers 212 or other component of the speaker verifier 202 determine whether the distance score or other outputted values satisfy threshold values.

Figure 3A:
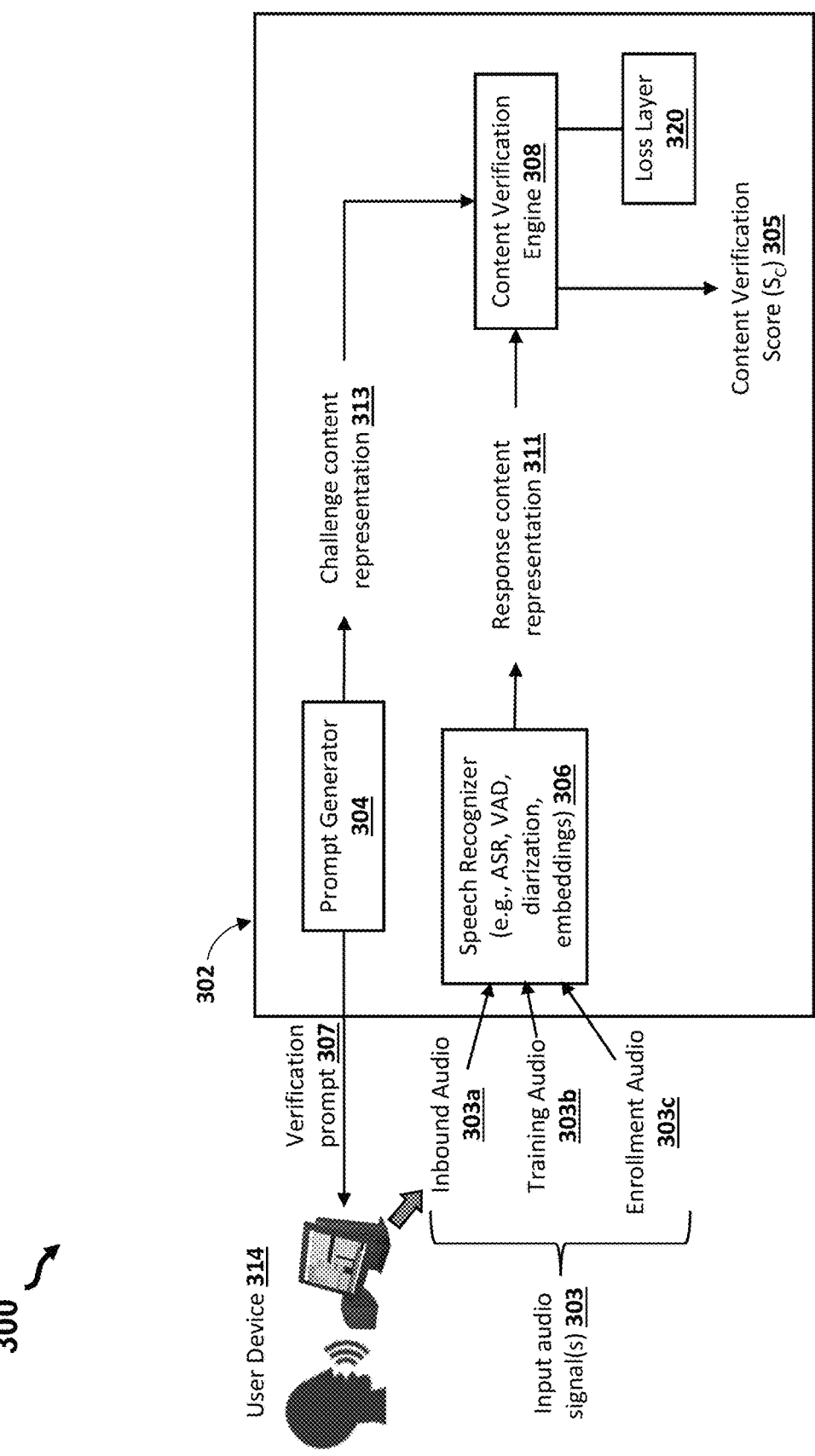
FIGS. 3A-3B show dataflow amongst components of a system for speaker verification based on content verification using speech signals, according to an embodiment.
Figure 3B:
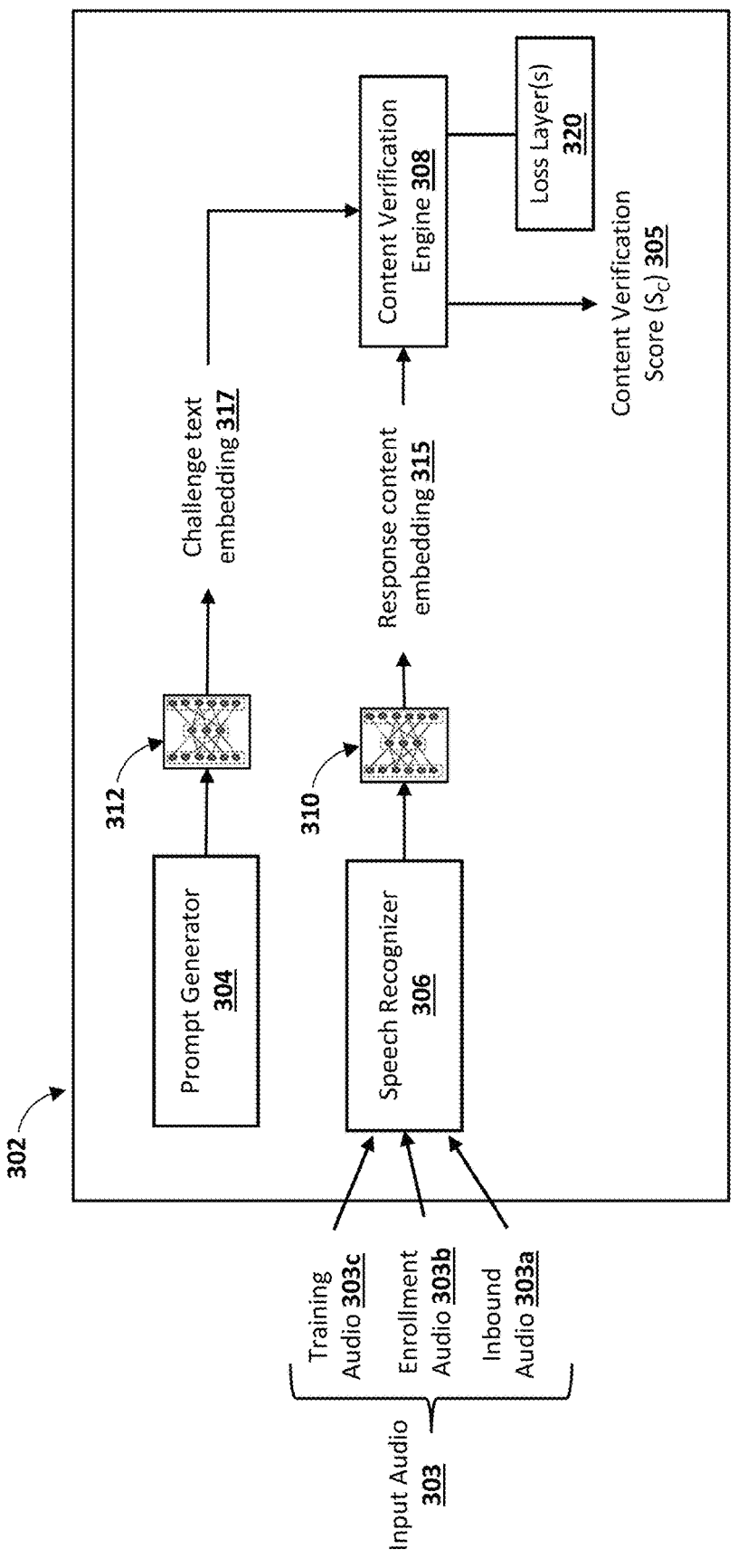

FIGS. 3A-3B show dataflow amongst components of a system 300 for speaker verification based on content verification using speech signals. The system 300 includes a server (e.g., analytics server 102) executing software programming and routines that implement a machine-learning architecture for speaker content verification and authentication (referred to as a spoken content verifier 302 for case of description and understanding). In the example embodiments of FIGS. 3A-3B, the server executes the spoken content verifier 302, though the software components of the machine-learning architecture may be executed by any computing device comprising hardware (e.g., processor, non-transitory storage medium) and software components capable of performing operations of the spoken content verifier 302, and/or by any number of such computing devices. The system 300 as depicted further includes one or more user devices 314 (e.g., end-user devices 114) for displaying verification prompts 307 to a user via user interface of the end-user device 314 and capturing input audio signals 303a-303c (generally referred to as input audio signals 303) containing speech signals of the user.

The spoken content verifier 302 includes or is embodied in software programming that execute various functions, layers, or other aspects (e.g., machine-learning models) of the machine-learning architecture of the spoken content verifier 302. At the frontend of the spoken content verifier 302, the spoken content verifier 302 includes a prompt generator 304, layers that define a speech recognizer 306. At the backend, the spoken content verifier 302 includes layers and functions that define a content verification engine 308, programmed and trained to perform various classification and scoring operations, such as a distance scoring operation, to produce a content verification score 305 ($S_c$) or similar types of scores (e.g., authentication score, risk score) or other determinations. The spoken content verifier 302 verifies whether response content of a spoken utterance matches a text challenge text of the verification prompt presented to a user on graphical user interface at a screen or monitor of the end-user device 314.

In the embodiment depicted in FIG. 3A, in the frontend, the speech recognizer 306 of the spoken content verifier 302 generates various types of response content representations 311 from the input audio signals 303, and the prompt generator 304 generates or converts the challenge content of the verification prompts 307 into various types of challenge content representations 313. At the backend, the content verification engine 308 executes computations or processes for generating the content verification score 305 using the response content representations 311 and challenge content representations 313.

In the embodiment depicted in FIG. 3B, the frontend of the spoken content verifier 302 includes a content embedding extractor 310 and a text embedding extractor 312. At the backend of the spoken content verifier 302, the content verification engine 308 is trained to determine the content verification score by computing a distance or similarity between a response text embedding 315 and a challenge text embedding 317.

The prompt generator 304 generates challenge content for verification prompt 307 and transmits the verification prompt 307 to the end-user device 314. The verification prompt 307 presents the challenge content, such as text (e.g., word, phrase) or an image, the user must speak aloud to a microphone coupled to the end-user device 314. In some implementations, the prompt generator 304 randomly generates the challenge content for the verification prompt 307 using content retrieved from a content corpus, which may be stored in one or more databases (analytics database 104, provider database 112) or scraped from an online webpage. As an example, the prompt generator 304 randomly generates challenge text containing a word or phrase retrieved from the content corpus. As another example, the prompt generator 304 may randomly selects and retrieves a challenge image from the content corpus. In some implementations, the prompt generator 304 generates the challenge content for the verification prompt 307 using preconfigured content for the user, such as a passphrase or preconfigured image stored in a user database. Optionally, the prompt generator 304 generates or updates the verification prompt 307 at a preconfigured interval or in response to a triggering event, such as the server receiving a request to perform the content verification operations.

The prompt generator 304 may generate the verification prompt 307 for presenting the graphical user interface at the end-user device 314 according to protocols and machine-readable software code compatible with the software programming of the end-user device 314. As an example, the prompt generator 304 generates the verification prompt as a component of a webpage hosted by a webserver of the system 300, accessed by a browser of the end-user device 314. As another example, the prompt generator 304 generates the verification prompt 307 as a component of a graphical user interface of a native application that is installed and executed at the end-user device 314.

In operation, the prompt generator 304 generates and transmits the verification prompt 307 to the end-user device 314, which includes executable instructions for the end-user device 314 to present the challenge content to the user or caller via the graphical user interface. The user reviews the verification prompt 307 presented at the end-user device 314 and speaks a phrase into a microphone coupled to the end-user device 314, where the phrase is purportedly matched to the challenge content of the verification prompt 307 reviewed by the user. The microphone captures the spoken phrase as one or more utterances and converts the utterances (and any other acoustic waves captured by the microphone) into an electric audio signal. In some cases, the end-user device 314 and/or the server executes additional operations for processing the electric audio signal, such as a media compression function, to prepare the input audio signal 303 for ingestion by the server and spoken content verifier 302. The end-user device 314 then transmits the input audio signal 303 to the server hosting the spoken content verifier 302 or other computing device of the system 300 (e.g., provider server 111).

In some implementations, the server obtains the input audio signals 303 from various types of data sources or devices, including end-user devices 314 and servers or databases of the system 300 (e.g., analytics servers 102, provider servers 111, analytics database 104, provider database 112), among others. As an example, in a training phase of the machine-learning architecture, the spoken content verifier 302 obtains the audio signals 303 as training signals 303c from a corpora of training audio signals 303c from the databases of the system 300; or the server may generate simulated training audio signals 303c by executing various data augmentation operations on the "clean" training audio signals 303c. As another example, the input audio signals 303 may include enrollment audio signals 303b for the user, as the input audio signals 303 obtained from the end-user devices 314 during an enrollment phase. The training audio signals 303c may be fed to the spoken content verifier 302 for training the machine-learning models of the speech recognizer 306 or content verification engine 308. Optionally, the enrollment audio signals 303b may be used to extract and generate, for example, enrollment voiceprints for the user, which may be implemented by the speech recognizer 306 for recognizing a particular speaker or by the content verification engine 308 for recognizing an instance of the speaker providing an expected spoken content corresponding to challenge content for the prompt generator 304 to generate the verification prompt 307.

The speech recognizer 306 is a software program (e.g., ASR, VAD, speaker diarization, speaker verifier) for analyzing input audio signals 303 and identifying or detecting instances of a spoken utterances in the input audio signals 303. The speech recognizer 306 includes functions and layers of a machine-learning architecture, including software routines implementing a machine-learning model trained and programmed to detect one or more spoken utterances within an input audio signal 303.

The speech recognizer 306 obtains the input audio signal 303 and generates various types or forms of outputs (shown as the response content representation 311). As an example, the speech recognizer 306 parses the input audio signal 303 into frames or segments containing instances of speaker utterances detected by the speech recognizer 306. The speech recognizer 306 outputs a speech signal comprising the speech portions of the input audio signal 303 containing the detected utterances. As another example, the speech recognizer 306 outputs timestamps or other metadata indicators associated with the input audio signal 303 indicating the instances of utterances that speech recognizer 306 detected in the input audio signal 303. As another example, the speech recognizer 306 generates and outputs a text file containing a transcription of the spoken utterances identified in the input audio signal 303 or from a speech signal parsed from the input audio signal 303 by the speech recognizer 306.

The content verification engine 308 includes software programming that analyzes the speech signal or other outputs of the speech recognizer 306 to determine whether the spoken content in the speech signal matches the expected test content. The content verification engine 308 includes functions and layers of a machine-learning architecture, including software routines implementing a machine-learning model trained and programmed to analyze the speech signal and generate a content verification score 305 indicating a likelihood or probability that the spoken response content matches the expected challenge content, based upon the content verification engine 308 determining a distance or similarity value between the spoken response content and the expected challenge content. In some cases, the content verification engine 308 determines the content verification score 305 indicates a match when the content verification score 305 satisfies a content match threshold. The content verification engine 308 may compute the content verification score 305 based upon one or more machine-learning techniques or machine-learning models that process and compare characteristics and features of audio signal data.

The content verification engine 308 may implement various operations or computations to generate the content verification score 305. The speech recognizer 306 and prompt generator 304 generate the response content representations 311 and challenge content representations 313 in accordance with the scoring operation executed by the content verification engine 308 to generate the content verification score 305.

In some configurations, the content verification engine 308 generates the content verification score 305 by computing or determining a character or word error rate between the challenge text of the challenge content in the verification prompt 307 and decoded response text of a text transcription of the spoken response content. The speech recognizer 306 receives the input audio signal 303 and generates the text transcription as the response content representation 311. The prompt generator 304 formats the challenge text of the verification prompt 307 and forwards the challenge text as the challenge content representation 313 to the content verification engine 308. The content verification engine 308 compares the challenge text of the challenge content against the response text of the text transcription generated by the speech recognizer 306. The content verification engine 308 compares the text and determines the character or word error rate based upon the comparison. The error rate may be expressed as a ratio, percentage, or rate, which the content verification engine 308 can output as the content verification score 305.

In some configurations, the content verification engine 308 may generate the content verification score 305 based upon a Levenshtein distance between the challenge text of the challenge content of the verification prompt 307 and the response text of the text transcription produced by the speech recognizer 306. The speech recognizer 306 generates the text transcription of the spoken utterances of the input audio signal 303 from the end-user device 314. The content verification engine 308 compares the challenge text of the challenge content against the response text of the text transcription generated by the speech recognizer 306. The content verification engine 308 determines the Levenshtein distance based upon the comparison, which the content verification engine 308 can output as the content verification score 305.

In some configurations, the content verification engine 308 may generate the content verification score 305 as a ratio of a first likelihood or probability of a decoding path containing the challenge text of the test content of the verification prompt, to a second likelihood or probability of the top-K best paths.

In some configurations, the content verification engine 308 may generate the content verification score 305 by executing a neural network architecture trained to generate the content verification score 305. The layers of the neural network of the content verification engine 308 takes as inputs the challenge text of the test content and the ASR output logits of the text transcription produced by the speech recognizer 306. An output logit includes the output of a final layer of the neural network before the output is passed through a softmax function to produce probabilities for each possible output category. The output logit represents raw, unnormalized scores for each category. During training, the content verification engine 308 and loss layers 320 may determine and use the disparity (as a level of error) between the output logits of the response content representation 311 and the actual targets (text of the challenge content representation 313). The loss layers 320 adjusts the hyperparameters of the speech recognizer 306 to minimize the disparity by implementing, for example, backpropagation and gradient descent. In some cases, loss layers 320 use the output logits in training processes to calculate the loss and update the neural network's parameters. The speech recognizer 306 (e.g., ASR program) includes a neural network that ingests and processes the input audio signal 303 and produces an output logit as the response content representation 311 for each possible phoneme, word, or other speech unit. The output logits are then fed into a softmax function, which normalizes the scores into probabilities, allowing the machine-learning model of the speech recognizer 306 to make predictions about the most likely speech unit for a given input. At the backend, the content verification engine 308 generates the content verification score 305 based upon the difference between the text in the output logits in the response content representation 311 compared against the text of the challenge response in the challenge content representation 313.

With reference to FIG. 3B, in some configurations, the content verification engine 308 may generate the content verification score 305 by extracting and scoring embeddings. The text embedding extractor 312 extracts a challenge text embedding 317 using certain text features of the challenge content of the verification prompt 307. The speech recognizer 306 receives the input audio signal 303, identifies the speech portions, outputs the speech signal as an audio or spectro-temporal representation as the response content representation 311 of the input audio signal 303. During training, the content embedding extractor 310 is trained to extract features and the response text embeddings 315 from the response content representation 311 of inbound audio signals 303a to map to the challenge text embeddings 317 in the same space. Likewise, the text embedding extractor 312 is trained to extract the features and the challenge text embeddings 317 from the challenge text of training verification prompts 307 to map to the response text embeddings 315 in the same space. The content verification engine 308 is trained to determine a distance or difference (e.g., cosine distance) between the response text embedding 315 and challenge text embedding 317. In some embodiments, the pair of neural networks in the content embedding extractor 310 and text embedding extractor 312 may be combined and the content verification engine 308 may implements a fuzzy matching of content embedding extractor 310 and text embedding extractor 312 to verify the spoken content.

The spoken content verifier 302 includes loss layers 320 that determine a level of error produced by scoring layers or classifier layers of the content verification engine 308. The loss layer 320 may compare the predicted outputs of the content verification engine 308 (e.g., content verification score 305, verification indicator) against corresponding expected outputs, as indicated by the expected challenge content (e.g., challenge content representation 313, challenge text embedding 317, expected content verification score 305). The loss layer 320 may adjust hyperparameters of the content verification engine 308 or other components of the spoken content verifier 302 (e.g., speech recognizer 306, content verification score 305, content embedding extractor 310, text embedding extractor 312) to minimize the level(s) of error. As depicted in FIGS. 3A-3B, the loss layers 320 may train the components of the spoken content verifier 302 jointly. In some embodiments, the spoken content verifier 302 includes loss layers 320 for separately training one or more components (e.g., speech recognizer 306, content verification score 305, content embedding extractor 310, text embedding extractor 312) of the spoken content verifier 302.

In some embodiments, the layers of the content verification engine 308 may additionally take the audio quality parameters or the audio quality score ($S_Q$) as inputs to produce a calibrated content verification score 305 for different acoustic conditions. For instance, certain layers of the content verification engine 308 may generate the content verification score 305 according to the various techniques described herein, and additional layers are trained to calibrate the content verification score 305 according to the audio quality score or audio quality parameters.

The content verification score 305 represents the likelihood or probability that the responsive spoken utterances from the caller-user matches the challenge content of the verification prompt. The content verification engine 308 or other software component of the server or machine-learning architecture may compare the content verification score 305 against a content verification threshold score to determine whether the content verification score 305 represents a sufficient likelihood that the user spoke the appropriate word or phrase presented in the challenge content of the verification prompt 307. The spoken content verifier 302 may output the content verification score 305 and/or an indicator of whether the content verification failed or succeeded.

Figure 4:
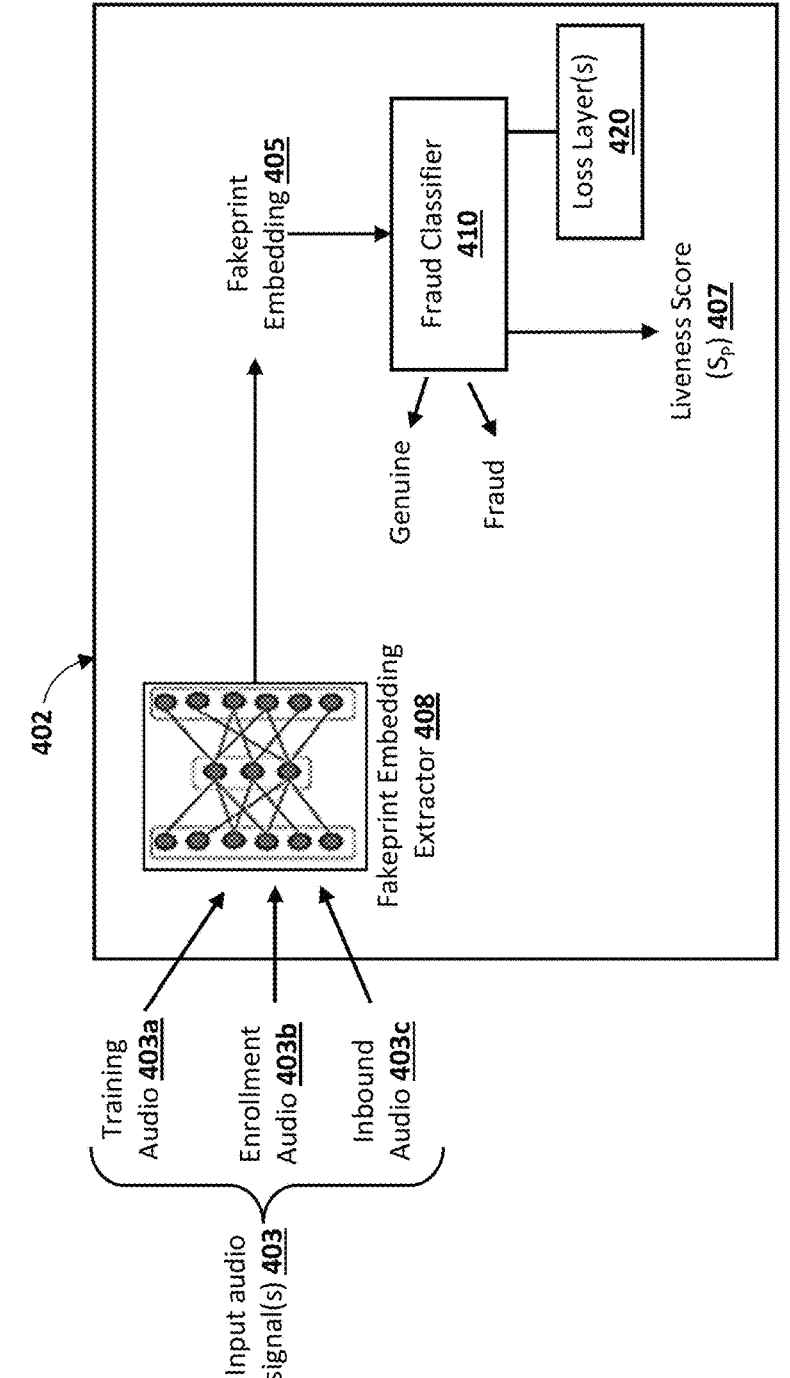
FIG. 4 shows dataflow amongst components of a system for passive liveness detection based on extracting and evaluating fakeprint embeddings, according to an embodiment.

FIG. 4 shows dataflow amongst components of a system 400 for passive liveness detection based on extracting and evaluating fakeprint embeddings 405 (sometimes referred to as spoofprints). The system 400 includes a server (e.g., analytics server 102) executing software programming and routines that implement a machine-learning architecture for liveness detection (referred to as a passive liveness detector 402 for ease of description and understanding). In the example embodiment of FIG. 4, the server executes the passive liveness detector 402, though the software components of the machine-learning architecture may be executed by any computing device comprising hardware (e.g., processor, non-transitory storage medium) and software components capable of performing operations of the passive liveness detector 402, and/or by any number of such computing devices. The passive liveness detector 402 ingests input audio signals 403a-403c (generally referred to as input audio signals 403), extracts features related to or indicative of fraud artifacts and a fakeprint vector embedding 405, and executes the fraud classifier 410 or other scoring layers of the fraud classifier 410 to generate a liveness score ($S_P$) 407.

The passive liveness detector 402 includes or is embodied in software programming that execute various functions, layers, or other aspects (e.g., machine-learning models) of the machine-learning architecture of the passive liveness detector 402. At the frontend of the machine-learning architecture in the passive liveness detector 402, the passive liveness detector 402 includes layers that define, for example, input layers (not shown), speech recognizers, and/or a feature extractor for extracting features from input audio signals 403; layers that define a fakeprint embedding extractor (fakeprint extractor 408) for extracting the features and/or fakeprint feature vector embeddings (fakeprints 405) using the various types of features extracted from the input audio signal 403. As a backend, the passive liveness detector 402 includes machine-learning layers including functions and machine-learning models of a spoof classifier 410 or other types of scoring layers, which perform various classifier or scoring operations, such as a distance scoring operation, to produce and evaluate a passive liveness score 407 ($S_P$) that indicates the likelihood that the input audio signal 403 contains fraudulent speech signals associated with a presentation attack, or similar types of scores (e.g., authentication score, risk score) or other determinations.

The passive liveness detector 402 obtains the input audio signal 403 according to the corresponding operational phase of the machine-learning architecture. During a training phase, the passive liveness detector 402 receives or retrieves training audio signals 403a from one or more corpora of training signals stored in one or more databases (e.g., analytics server 102, provider database 112). During an optional enrollment phase, the passive liveness detector 402 receives or retrieves enrollment audio signals 403b known to include instances of an enrolled speaker's voice or known to include instances of one or more types of fraud, such as an enrollment audio signal 403b known to contain a deepfake of utterances of a person or spoofed metadata of a device, among others. In the training or enrollment phase, the passive liveness detector 402 or other software component of the server may generate simulated instances of the training audio signals 403a or enrollment audio signals 403d using one or more types of data augmentation operations that manipulate the audio features or metadata of a "clean" or "genuine" training audio signal or enrollment audio signal. During the deployment phase, the passive liveness detector 402 receives an inbound audio signal 403a from a user device (e.g., end-user device 114).

In the training phase, the server feeds the training audio signals 403a into the input layers 204, where the training audio signals 403a may include any number of genuine and fraudulent speech signals, as indicated by training labels (not shown) associated with the training audio signals 403a. The training audio signals 403a may be raw audio files or pre-processed according to one or more pre-processing operations of input layers. The input layers may perform one or more pre-processing operations on the training audio signals 403a. The input layers extract certain features from the training audio signals 403a and perform various pre-processing and/or data augmentation operations on the training audio signals 403a. For instance, input layers execute a transform function to convert the training audio signals 403a from a time-frequency domain to a spectro-temporal representation or convert the training audio signals 403a into multi-dimensional log filter banks (LFBs). The training audio signals 403a are then fed into functional layers defining the fakeprint embedding extractor 408. The fakeprint extractor 408 generates predicted fakeprint feature vectors based on the predicted features fed into the fakeprint extractor 408, which extracts, for example, a predicted fakeprint 405 based upon the one or more predicted feature vectors.

The machine-learning model(s) of the fakeprint embedding extractor 408 is trained by executing a loss function of a loss layer 220 for tuning the voiceprint extractor 206 according to the training labels 223 associated with the training audio signals 403a. The classifier 410 uses the fakeprints 405 to determine whether the given input audio signal 403 is, for example, a genuine or fraudulent. The loss layer 420 tunes the fakeprint extractor 408 by performing the loss function (e.g., LMCL, PLDA) to determine the distance (e.g., large margin cosine loss) between the predicted classifications, as indicated by supervised training labels or previously generated learning clusters. In some embodiments, a user may tune the loss layer 420 (e.g., adjust the m value of the LMCL function) to tune the sensitivity of the loss function. The server feeds the training audio signals 403a into the passive liveness detector 402 to re-train and further tune the layers of the passive liveness detector 402 (e.g., adjust scoring layers of the fraud classifier 410) and/or tune the fakeprint extractor 408. The server fixes the hyper-parameters of the fakeprint extractor 408 and/or the fully-connected layers of the fakeprint extractor 408 or the fraud classifier 410 when the server determines that the predicted outputs (e.g., classifications, feature vectors, embeddings) converge with the expected outputs, such that a level of error is within a threshold margin of error.

In some embodiments, the server may disable the classifier 410, scoring layers, loss layers 420, or other layers of the passive liveness detector 402 for the enrollment phase or deployment phase. In some embodiments, the passive liveness detector 402 may use the enrollment fakeprint 405 to further tune the aspects of the passive liveness detector 402. The passive liveness detector 402 may feed the fakeprint 405 into the fraud classifier 410 or scoring layers, which may include portions of the fully-connected layers and/or the fraud classifier 410, to generate a predicated output based on the enrollment audio signal 403b. The loss layers 420 may determine the level error between the predicted outputs of the fraud classifier 410 or scoring layers and the expected outputs based on the inbound audio signal 403b and enrolled fakeprint 405.

During the deployment phase, the input layers may perform the pre-processing operations to prepare an inbound audio signal 403c for the fakeprint extractor 408. The server, however, may disable the augmentation operations of the input layers, such that the fakeprint extractor 408 evaluates the features of the inbound audio signal 403c as received. The fakeprint extractor 408 comprises one or more layers of the machine-learning architecture trained (during a training phase) to detect speech and/or generate feature vectors based on the features tailored to detect fraud artifacts and extracted from the audio signals 403c. Using the features extracted from the input audio signal 403, the fakeprint extractor 408 extracts and outputs an inbound fakeprint 405 as mathematical representation of fraud artifacts in the input audio signal 403.

The passive liveness detector 402 feeds the inbound fakeprint 405 to the fraud classifier 410 or scoring layers to perform various scoring operations. The scoring layers and/or the fraud classifier 410 perform a distance scoring operation that determines the distance (e.g., similarities, differences) between the inbound fakeprint 405 and a centroid or feature vector previously generated as fraud-detection cluster using the training fakeprints 405 extracted from the training audio signal 403a. The passive liveness score 407 ($S_P$) indicates the likelihood that the input audio signal 403 is fraudulent. The passive liveness score 407 may be a value generated by the scoring layers and/or fraud classifier 410 based on one or more scoring operations (e.g., distance scoring). For instance, the scoring layers or other component of the passive liveness detector 402 determine whether the distance score or other outputted values satisfy threshold values.

Additional example embodiments of the passive liveness detector 402, may be found in U.S. patent application Ser. No. 18/439,049, filed Feb. 2, 2024, which is incorporated by reference in its entirety.

Figures 5A, 5B:
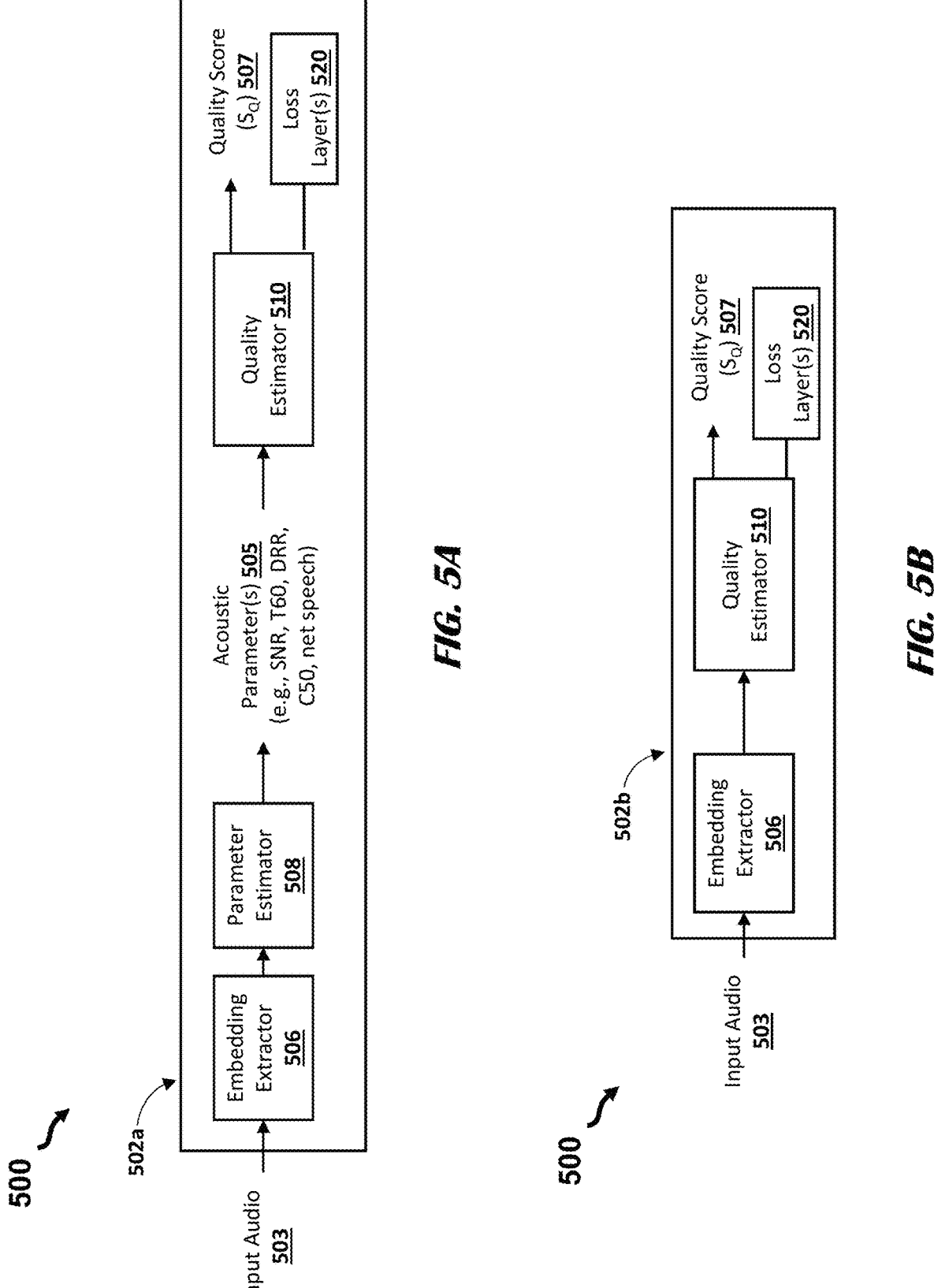
FIGS. 5A-5B show dataflow amongst components of a system for speaker verification based on content verification using speech signals, according to an embodiment.

FIGS. 5A-5B shows dataflow amongst components of a system 500 for speaker verification based on content verification using speech signals. The system 500 includes a server (e.g., analytics server 102) executing software programming and routines that implement one or more implementations of a speech quality estimator 502a-502b having functions, layers, or machine-learning models of a machine-learning architecture programmed or trained for performing speech quality estimation for a speech signal of an input audio signal 503, which is referred to as a speech quality estimator 502a-502b (generally referred to a speech quality estimator 502 for ease of description and understanding). In the example embodiment of FIGS. 5A-5B, the server executes the speech quality estimator 502, though the software components of the machine-learning architecture may be executed by any computing device comprising hardware (e.g., processor, non-transitory storage medium) and software components capable of performing operations of the speech quality estimator 502, and/or by any number of such computing devices.

The speech quality estimator 502 includes or is embodied in software programming that execute various functions, layers, or other aspects (e.g., machine-learning models) of the machine-learning architecture of the speech quality estimator 502. In the example system 500, the speech quality estimator 502 includes input layers (not shown) for ingesting audio signals 503 and performing various pre-processing and augmentation operations, and/or extracting various features; layers of an embedding extractor 506 for extracting features and one or more types of embedding feature vectors; layers that define a parameter estimator 508 for generating acoustic parameters 505, and a quality estimation scoring layer 510 for generating a speech quality score 507 ($S_Q$) as an integrated value of the acoustic parameters 505 that indicates the quality of the speech signal obtained in the input audio signal 503. Non-limiting examples of the acoustic parameters 505 include SNR, T60, DRR, C50, and net speech. In some embodiments, the acoustic parameters 505 include a magnitude value or the magnitude value may be computed separately from the acoustic parameters 505.

In some embodiments, as in FIG. 5A, the speech quality estimator 502a includes a parameter estimator 508, comprising a neural network or other type of machine-learning model trained to detect or estimate the severity of one or more types of degradation in the input audio signal 503, using the embedding(s) extracted by the embedding extractor 506. The quality estimation scoring layer 510 may determine the speech quality score 507 by, for example, algorithmically combining or otherwise computing the speech quality score 507 using the several acoustic parameters 505 generated by the parameter estimator 508.

In some embodiments, as in FIG. 5B, the speech quality estimator 502b need not compute or output the acoustic parameters 505. The embedding extractor 506 of the speech quality estimator 502b extracts the features and the embedding(s) and feeds the embeddings directly into the quality estimation scoring layer 510, without computing or outputting the acoustic parameters 505. In speech quality estimator 502b, the embeddings are extracted by the embedding extractor feature extractor 506 and fed directly into the quality estimation scoring layer 510. The quality estimation scoring layer 510 is trained to compute the speech quality score 507 using the embedding(s) extracted from the embedding extractor. The parameter estimator 508 and/or the quality estimation scoring layer 510 may include one or more machine-learning models for audio quality estimation that identifies types of acoustic parameters 505, determines values for the acoustic parameters 505, and/or generates an integrated speech quality score 507 using the acoustic parameters 505.

The server trains the parameter estimator 508 and/or quality estimation scoring layer 510 to determine or score the acoustic parameters 505 and speech quality score 507 using training audio signals, which may be previously received observed audio signals 503, simulated audio signals, clean audio signals. The training audio signals can be stored in one or more corpora that the server references during training. The training audio signals received from each corpus are each associated with a training label (not shown) indicating, for example, the known and expected acoustic parameters 505, acoustic parameter scores, and/or speech quality score 507 for the particular training audio signal.

Loss layers 520 of speech quality estimator 502 reference these training labels to determine a level of error between the predicted outputs produced by the speech quality estimator 502 during training and the expected outputs indicated by the training labels. The loss layers 520 reference and compare the training label associated with the training audio signal, which indicates expected outputs, against the predicted outputs generated by the current state of the quality estimation scoring layer 510 or parameter estimator 508 to determine the level of error. The loss layers 520 executes loss functions (e.g., logistic regression, PLDA) to determine the loss (level of error) and adjust the hyperparameters or weighting coefficients of the various machine-learning models or neural network layers to reduce the level of error, thereby minimizing the differences between (or otherwise converging) the predicted output and the expected output.

Figure 6:
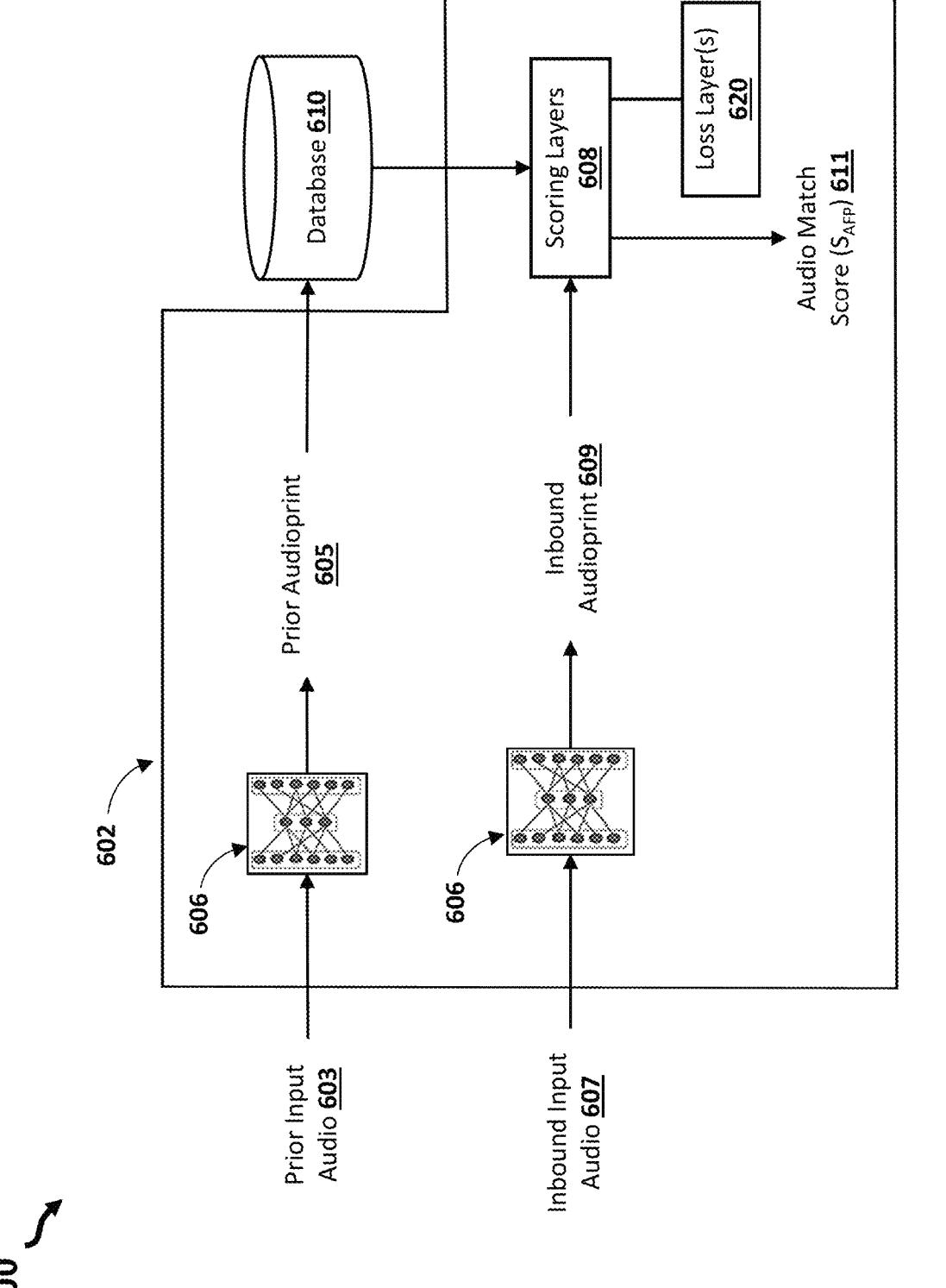
FIG. 6 shows dataflow amongst components of a system for active or passive liveness detection for detecting repeated instances of particular audio signal recordings, according to an embodiment.

FIG. 6 shows dataflow amongst components of a system 600 for active or passive liveness detection for detecting repeated instances of particular audio signal recordings, which includes instances when a recording of a prior audio input 603 of a prior call is repeated by (and matches to) the recording of an inbound audio input 607 of a current or later inbound call. The audio fingerprint engine 602 extracts audio signal fingerprints as feature vector embeddings (sometimes referred to as audio fingerprints or audioprints 605, 609) that are stored into a database 610 (e.g., analytics server 102, provider database 112). The audio fingerprint engine 602 generates an audio match score 611 ($S_{AFP}$) based upon a distance or similarity between audioprints 605, 609 and representing a likelihood or probability that the inbound audio input 607 matches (and is a repeated instance of) a prior audio input 603. The system 600 includes a server (e.g., analytics server 102) executing software programming and routines of the audio fingerprint engine 602 that implement a machine-learning architecture for audio fingerprinting for audio replay detection. In the example embodiment of FIG. 6, the server executes the audio fingerprint engine 602, though the software components of the machine-learning architecture may be executed by any computing device comprising hardware (e.g., processor, non-transitory storage medium) and software components capable of performing operations of the audio fingerprint engine 602, and/or by any number of such computing devices.

The audio fingerprint engine 602 includes or is embodied in software programming that execute various functions, layers, or other aspects (e.g., machine-learning models) of the machine-learning architecture of the audio fingerprint engine 602. In the example system 600, the audio fingerprint engine 602 includes input layers (not shown) for ingesting audio data inputs 603, 607 and performing various pre-processing and augmentation operations; layers that define an feature extractor 606 for extracting features, feature vectors, and audioprint 605, 609 embeddings; and one or more scoring layers 608 that perform various scoring operations, such as a distance scoring operation, to produce the audio match score 611 ($S_{AFP}$) or similar types of scores (e.g., authentication score, risk score) or other determinations.

The server may execute the audio fingerprint engine 602 on the audio data inputs 603, 607 for inbound calls received by a call center system or analytics server to extract and evaluate the audioprints 605, 609. The feature extractor 606 includes a machine-learning model trained to extract a set of audio recording features for a speech signal of an audio signal obtained in the inbound audio input 607. The recording features representing certain acoustic and metadata features of the inbound audio input 607 are selected and tailored for quickly detecting repeated instances of an inbound speaker-user's utterances in an audio recording. The amount of audio recording features is preferably minimal or nominal to quickly detect repeated instances of audio recordings in audio data inputs 603, 607. Typically, the amount of audio recording features may be comparatively smaller than the amount of features extracted and used for a speaker's voiceprint feature vector embedding, extracted by a speaker verifier. Similar to other input layers and/or embedding extractors described herein, the feature extractor 606 includes machine-learning model (e.g., neural network architecture) trained to extract the set of audio recording features of the inbound audio input 607 and audioprints 605, 609 using the set of features fed into the feature extractor 606 to generate and output the audioprints 605, 609.

The scoring layers 608 may determine the audio match score 611 by computing a distance or similarity between the inbound audioprint 609 and the prior audioprints 605. The audio fingerprint engine 602 determines that the inbound audio input 607 is a repeated instance of a prior audio input 603 when the audio match score 611 satisfies an audio fingerprint threshold score, indicating that the recording of the inbound audio input 607 is a repeated instance of the recording of the prior audio input 603 and is likely a replay of the same speech signal audio recording. If the audio fingerprint engine 602 determines that the inbound audio input 607 is a new audio recording that does not match a prior audio input 603, then the audio fingerprint engine 602 stores the inbound audioprint 609 into the database 610. In these circumstances, the audio fingerprint engine 602 may later reference the inbound audioprint 609, now stored into the database 610, as a prior audioprint 605 for a later inbound audio input 607.

The server uses training audio signals to train the scoring layers 608 to determine the audio match score 611 indicating the similarity between the prior audioprint 605 and the inbound audioprint 609. The training audio signals can be stored in one or more corpora in databases 610 accessible to the server during training. The training audio signals received from each corpus are each associated with a training label (not shown) indicating, for example, the known prior audioprint 605 or an indicator whether two training signals are the same training signal.

Loss layers 620 of audio fingerprint engine 602 reference these training labels to determine a level of error between the predicted outputs produced by the speech quality estimator 502 during training and the expected outputs indicated by the training labels. The loss layers 520 reference and compare the training label associated with the training audio signal, which indicates expected outputs, against the predicted outputs generated by the current state of the quality estimation scoring layer 510 or parameter estimator 508 to determine the level of error. The loss layers 520 executes loss functions (e.g., logistic regression, PLDA) to determine the loss (level of error) and adjust the hyperparameters or weighting coefficients of the various machine-learning models or neural network layers to reduce the level of error, thereby minimizing the differences between (or otherwise converging) the predicted output and the expected output.

The machine-learning model(s) of the audio fingerprint engine 602 are trained by executing the loss function of a loss layer 620 for tuning the feature extractor 606 or scoring layers 608 according to the training labels associated with the training audio signals. The scoring layers 608 use the training audioprints 605, 609 to determine whether a given training inbound audio input 607 is matched to a training prior audio input 603. The loss layer 220 tunes the feature extractor 606 or the scoring layers 608 by performing the loss function (e.g., LMCL, PLDA) to determine the distance (e.g., large margin cosine loss) between the predicted outputs (e.g., predicted inbound audioprint 609 for a training inbound audio input 607; predicted audio match score 611) and the expected outputs (e.g., expected inbound audioprint 609 for the training inbound audio input 607; expected audio match score 611), as indicated by supervised training label. The server may feed the training audio signals into the audio fingerprint engine 602 to re-train and further tune the layers of the audio fingerprint engine 602 and/or tune the feature extractor 606. The server fixes the hyper-parameters of the audio fingerprint engine 602 and/or the scoring layers 608 when the server determines that the predicted outputs converge with the expected outputs, such that a level of error is within a threshold margin of error.

Figure 7:
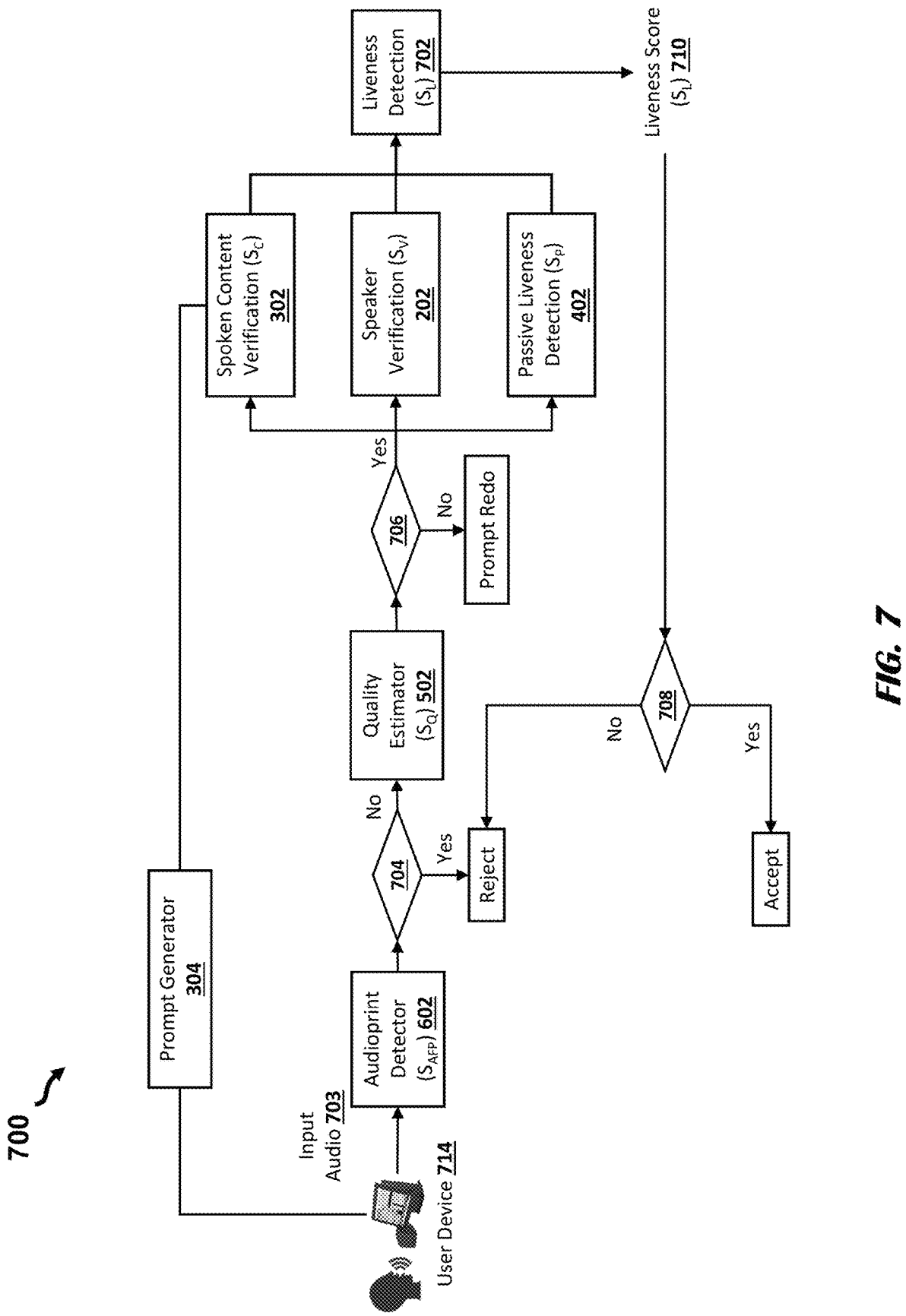
FIG. 7 shows dataflow amongst components of a system for combined speaker verification and passive and active liveness detection, according to an embodiment.

FIG. 7 shows dataflow amongst components of a system 700 for combined speaker verification and passive and active liveness detection. The system 700 includes a server (e.g., analytics server 102) executing software programming and routines of various operational engines or functions, which may implement layers, functions, or other aspects (e.g., machine-learning models) of a machine-learning architecture. For instance, the operational engines may include a speaker verifier 202, spoken content verifier 302, passive liveness detector 402, speech quality estimator 502, audio fingerprint engine 602, and combined liveness detector 702. In the example embodiment of FIG. 7, a server executes the various functions and features for generating the various output scores for an input audio signal 703, which may be ingested and analyzed by the combined liveness detector 702 to generate a combined liveness score 710 ($S_L$) for the input audio signal 703. In some embodiments, the software components and the various sub-components of the machine-learning architecture may be executed by any computing device comprising hardware (e.g., processor, non-transitory storage medium) and software components capable of performing operations described herein, and/or by any number of such computing devices.

The combined liveness detector 702 includes or is embodied in software programming that execute various functions, layers, or other aspects (e.g., machine-learning models) of the machine-learning architecture of the combined liveness detector 702. In the example system 700, the combined liveness detector 702 includes input layers (not shown) for ingesting and algorithmically combining various types of scores generated by other software engines, such as a content verification score 305 ($S_C$) generated by the spoken content verifier 302, a voice match score 211 ($S_V$) generated by the speaker verifier 202, and a passive liveness score 407 ($S_P$) generated by the passive liveness detector 402, among other potential types of scores. The combined liveness detector 702 may, for example, normalize the scores, concatenate the scores into a vector, average the scores, or otherwise perform various processing operations for combining the scores to generates the combined or fused liveness score 710 ($S_L$) as an output.

As shown in FIG. 7, a prompt generator 304 generates a verification prompt 307 containing challenge content and transmits the verification prompt 307 to the end-user device 714. The verification prompt 307 is presented to the user at a graphical user interface of the end-user device 714, instructing the user to speak a response corresponding to the challenge content of the verification prompt 307. The server receives, retrieves, generates, or otherwise obtains the input audio signal 703 according to an operational phase (e.g., training, enrollment, deployment) of the machine-learning architecture. The server may execute various pre-processing and/or data augmentations operations on the audio signal, such as speech detection, feature extraction, embedding extraction, and parsing the audio signal into segments.

The server feeds the input audio signal 703 into an audioprint detector 602 that extracts an audioprint for the input audio signal and determines an audio match score (SAFP) satisfies a matching threshold and/or outputs an indicator message, indicating whether the input audio signal 703 matches a prior audioprint of a prior audio signal. The server then executes a first evaluation function 704 to determine whether to proceed with processing the audio signal 703, based on whether the audioprint of the input audio signal 703 matches a prior audioprint and is therefore a prior recorded audio signal. If the server determines there is a match, the server may reject the call or otherwise executes or invoke one or more mitigation functions, such as transmitting an alert notification to a user interface of an administrative user device. If the server determines there is not match, then the server stores the new audioprint of the new input audio signal 703 into a database.

The server feeds the input audio signal 703 into an audio-speech quality estimator 502 to generate one or more acoustic parameters (e.g., acoustic parameters 505) and/or an overall quality score ($S_Q$) for the input audio signal 703 (or segments thereof). The server may store the acoustic parameters and quality score into a database or cache for reference in later operations.

In some embodiments, the server may perform an audio quality check 706, in which the server determines whether the speech audio quality of the input audio signal satisfies one or more quality thresholds for the acoustic parameters and/or the overall signal quality. For example, the server may receive an audio signal from a Zoom® conference call application executed by the end-user device 714 or other computing device. The quality estimator 502 may generate the acoustic parameters and the overall quality score for the input audio signal. If the audio quality check 706 determines that the overall quality score fails to satisfy a threshold, then the server may generate a redo prompt for the user. The server may determine that a certain acoustic parameter fails a threshold or a set of acoustic parameters suggest a particular type of problem (e.g., too close to the microphone), and indicate certain solutions.

The server may feed the input audio signal (or segment thereof) into the speaker verifier 202, content verifier 302, and passive liveness detector 402 to generate corresponding values for speaker verification (Sv), spoken content verification (Sc), and passive liveness detection (Sp), and, in some cases, the quality score (Sq). Using these values, the combined liveness detector 702 may generate a fused liveness score according to one or more process or techniques. In some cases, the combined liveness detector 702 executes programming for predefined operations for algorithmically combining the scores. In some cases, the combined liveness detector 702 executes programming for a data-driven weighted combination of scores to produce the final liveness score. In some cases, the combined liveness detector 702 executes programming for a neural network architecture trained to take the scores (Sv, Sc, Sp, Sa) as inputs and executes scoring layers trained to output a predicted fused liveness score. In some cases, the combined liveness detector 702 executes programming for a neural network architecture trained to take intermediate pre-final layer activations from each type of operation engine as inputs and programmed and trained to estimate the liveness score.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for detecting machine-based speech in calls, comprising:

obtaining, by a computer, an inbound audio signal comprising a speech signal containing response content as an utterance of the speaker, wherein the response content in the speech signal purportedly matches to challenge content of a verification prompt;

extracting, by the computer, a text embedding using a first set of features extracted for text of the challenge content, a spoken content embedding using a second set of features extracted for the speech signal, and a fakeprint using a third set one or more features extracted for one or more fraud artifacts of the speech signal;

generating, by the computer, a content verification score based upon a distance between the text embedding and the spoken content embedding;

executing, by the computer, a passive liveness detector to generate a passive liveness score for the inbound audio signal, the passive liveness detector having a set of layers of a machine-learning architecture trained to classify and score the input audio signal based upon the fakeprint extracted for the fraud artifacts of the inbound audio signal;

generating, by the computer, a fused liveness score based upon the content verification score and the passive liveness score; and identifying, by the computer, the inbound audio signal as genuine or fraudulent based upon comparing the fused liveness score against an overall risk threshold.

2. The method according to claim 1, further comprising:

extracting, by the computer, an inbound voiceprint for the speech signal using a fourth set of one or more features extracted for one or more acoustic features of the speech signal of the inbound audio signal; and generating, by the computer, a speaker verification score for the speech signal indicating a speaker recognition likelihood that the speaker is an enrolled user based upon a second distance between the inbound voiceprint and an enrolled voiceprint.

3. The method according to claim 2, wherein the computer generates the fused liveness score further using the speaker verification score.

4. The method according to claim 1, further comprising:

generating, by the computer, one or more acoustic parameters corresponding to one or more types of degradation in the speech signal of the inbound audio signal; and generating, by the computer, a speech quality score for the speech signal based upon the one or more acoustic parameters.

5. The method according to claim 4, wherein generating the content verification score includes:

calibrating, by the computer, the content verification score based upon the speech quality score.

6. The method according to claim 4, further comprising:

determining, by the computer, that the speech quality score for the speech signal fails a speech quality threshold; and transmitting, by the computer, to the user device a request for an improved speech signal for the caller.

7. The method according to claim 1, further comprising:

extracting, by the computer, an inbound audioprint using one or more features extracted from the audio signal;

generating, by the computer, an audio replay score for the inbound audio signal indicating an audio recording recognition likelihood that the inbound audio signal matches a prior audio signal based upon a distance between the inbound audioprint and a stored audioprint for the prior audio signal.

8. The method according to claim 7, further comprising identifying, by the computer, the inbound audio signal as fraudulent, in response to determining that the audio replay score satisfies a replay detection threshold value.

9. The method according to claim 7, further comprising storing, by the computer, the inbound audioprint into a database as a new stored audioprint.

10. The method according to claim 1, further comprising generating, by the computer, a verification prompt including the challenge content for display at a user interface of the user device associated with the caller.

11. A system for detecting machine-based speech in calls, comprising:

a computer having at least one processor, configured to:

obtain an inbound audio signal comprising a speech signal containing response content as an utterance of the speaker, wherein the response content in the speech signal purportedly matches to challenge content of a verification prompt;

extract a text embedding using a first set of features extracted for text of the challenge content, a spoken content embedding using a second set of features extracted for the speech signal, and a fakeprint using a third set one or more features extracted for one or more fraud artifacts of the speech signal;

generate a content verification score based upon a distance between the text embedding and the spoken content embedding;

execute a passive liveness detector having a set of layers of a machine-learning architecture to generate a passive liveness score for the inbound audio signal, the passive liveness detector trained to classify and score the input audio signal based upon the fakeprint extracted for the fraud artifacts of the inbound audio signal;

generate a fused liveness score based upon the content verification score and the passive liveness score; and identify the inbound audio signal as genuine or fraudulent based upon comparing the fused liveness score against an overall risk threshold.

12. The system according to claim 11, wherein the computer is further configured to:

extract an inbound voiceprint for the speech signal using a fourth set of one or more features extracted for one or more acoustic features of the speech signal of the inbound audio signal; and generate a speaker verification score for the speech signal indicating a speaker recognition likelihood that the speaker is an enrolled user based upon a second distance between the inbound voiceprint and an enrolled voiceprint.

13. The system according to claim 12, wherein the computer generates the fused liveness score further using the speaker verification score.

14. The system according to claim 11, wherein the computer is further configured to:

generate one or more acoustic parameters corresponding to one or more types of degradation in the speech signal of the inbound audio signal; and generate a speech quality score for the speech signal based upon the one or more acoustic parameters.

15. The system according to claim 14, wherein when generating the content verification score the computer is further configured to calibrate the content verification score based upon the speech quality score.

16. The system according to claim 14, wherein the computer is further configured to:

determine that the speech quality score for the speech signal fails a speech quality threshold; and transmit to the user device a request for an improved speech signal for the caller.

17. The system according to claim 11, wherein the computer is further configured to:

extract an inbound audioprint using one or more features extracted from the audio signal;

generate an audio replay score for the inbound audio signal indicating an audio recording recognition likelihood that the inbound audio signal matches a prior audio signal based upon a distance between the inbound audioprint and a stored audioprint for the prior audio signal.

18. The system according to claim 17, wherein the computer is further configured to identify the inbound audio signal as fraudulent, in response to determining that the audio replay score satisfies a replay detection threshold value.

19. The system according to claim 17, wherein the computer is further configured to store the inbound audioprint into a database as a new stored audioprint.

20. The system according to claim 11, wherein the computer is further configured to generate a verification prompt including the challenge content for display at a user interface of the user device associated with the caller.

* * * * *